(12) United States Patent
Aebi

(10) Patent No.: US 9,645,718 B2
(45) Date of Patent: May 9, 2017

(54) SYSTEM FOR ORGANIZING AND DISPLAYING INFORMATION ON A DISPLAY DEVICE

(71) Applicant: DIZMO AG, Zurich (CH)

(72) Inventor: Matthias Aebi, Zurich (CH)

(73) Assignee: DIZMO AG, Zürich (CH)

( * ) Notice: Subject to any disclaimer, the term of this patent is extended or adjusted under 35 U.S.C. 154(b) by 464 days.

(21) Appl. No.: 14/172,685

(22) Filed: Feb. 4, 2014

(65) Prior Publication Data

US 2014/0223313 A1    Aug. 7, 2014

Related U.S. Application Data

(60) Provisional application No. 61/762,165, filed on Feb. 7, 2013.

(51) Int. Cl.
G06F 3/048      (2013.01)
G06F 3/0484     (2013.01)
(Continued)

(52) U.S. Cl.
CPC ........ G06F 3/04842 (2013.01); G06F 3/0481 (2013.01); G06F 3/0482 (2013.01);
(Continued)

(58) Field of Classification Search
CPC ...................................................... G06F 3/048
See application file for complete search history.

(56) References Cited

U.S. PATENT DOCUMENTS

2005/0108620 A1* 5/2005 Allyn .................. G06F 3/04845
                                                    715/255
2007/0033172 A1* 2/2007 Williams .......... G06F 17/30067
(Continued)

FOREIGN PATENT DOCUMENTS

EP         1 533 687 A2    5/2005

OTHER PUBLICATIONS

International Preliminary Report on Patentability issued by WIPO for Application No. PCT/IB2014/000684, dated Aug. 11, 2015.
(Continued)

*Primary Examiner* — Xuyang Xia
(74) *Attorney, Agent, or Firm* — Fitzpatrick, Cella, Harper & Scinto

(57) ABSTRACT

A system for organizing, displaying, and interacting with information on a display device includes a computer processor and a memory device. The memory device stores at least one piece of computer code executable by the computers processor and data used by the computer code. A display device is structured to display a graphical interface to a user based on the computer code executed by the computer processor. Input devices are structured to receive information from the user based on one or more images of the graphical interface displayed on the display device. The computer code includes a main display module for providing a main display area of the graphical interface, and for organizing digital objects in a plurality of layers. The layers include a base layer corresponding to a base-surface of the main display area, and a fixed layer corresponding to a fixed-surface of the main display area.

114 Claims, 13 Drawing Sheets

System Structure

(51) Int. Cl.
*G06F 3/0482* (2013.01)
*G06F 3/0488* (2013.01)
*G06F 9/44* (2006.01)
*G06F 3/0481* (2013.01)

(52) U.S. Cl.
CPC ........ *G06F 3/0488* (2013.01); *G06F 3/04845* (2013.01); *G06F 3/04847* (2013.01); *G06F 9/4443* (2013.01); *G06F 2203/04806* (2013.01)

(56) References Cited

U.S. PATENT DOCUMENTS

| | | | |
|---|---|---|---|
| 2007/0118820 A1* | 5/2007 | Hatakeyama | G06F 3/0304 715/863 |
| 2008/0276182 A1* | 11/2008 | Leow | H04M 1/72525 715/740 |
| 2008/0282202 A1* | 11/2008 | Sunday | G06F 3/0483 715/863 |
| 2009/0027337 A1* | 1/2009 | Hildreth | G06F 3/011 345/158 |
| 2010/0192073 A1 | 7/2010 | Jamalpuri et al. | 715/762 |
| 2010/0302281 A1* | 12/2010 | Kim | G06F 3/04883 345/661 |
| 2011/0074710 A1* | 3/2011 | Weeldreyer | G06F 3/0481 345/173 |
| 2011/0161852 A1* | 6/2011 | Vainio | G06F 3/0488 715/769 |
| 2011/0163944 A1* | 7/2011 | Bilbrey | G01D 21/02 345/156 |
| 2012/0005577 A1* | 1/2012 | Chakra | G06F 3/0486 715/702 |
| 2012/0185762 A1* | 7/2012 | Ozer | G06F 17/2288 715/229 |
| 2013/0069991 A1* | 3/2013 | Davidson | G06F 3/0416 345/663 |
| 2013/0076668 A1 | 3/2013 | Maeda | 345/173 |
| 2014/0104320 A1* | 4/2014 | Davidson | G09G 5/32 345/681 |
| 2014/0149901 A1* | 5/2014 | Hunter | H04L 12/282 715/765 |
| 2014/0164913 A1* | 6/2014 | Jaros | G06F 17/212 715/243 |

OTHER PUBLICATIONS

Written Opinion issued by the Intellectual Property Office of Singapore for Application No. 11201506126V, dated Jun. 7, 2016.
Directness and Liveness in the MorphicUser Interface Construction EnvironmentJohn H. Maloney Randall B. SmithApple Computer, Inc.UIST '95. 8th ACM Symposium on User Interface Software and Technology, Nov. 14-17, 1995.†
An Introduction to Morphic: The Squeak User Interface FrameworkJohn MaloneyWalt Disney ImagineeringSqueak is an open source software project, under MIT license 1996-2010. It is well documented and based on Morphic UI.†

\* cited by examiner
† cited by third party

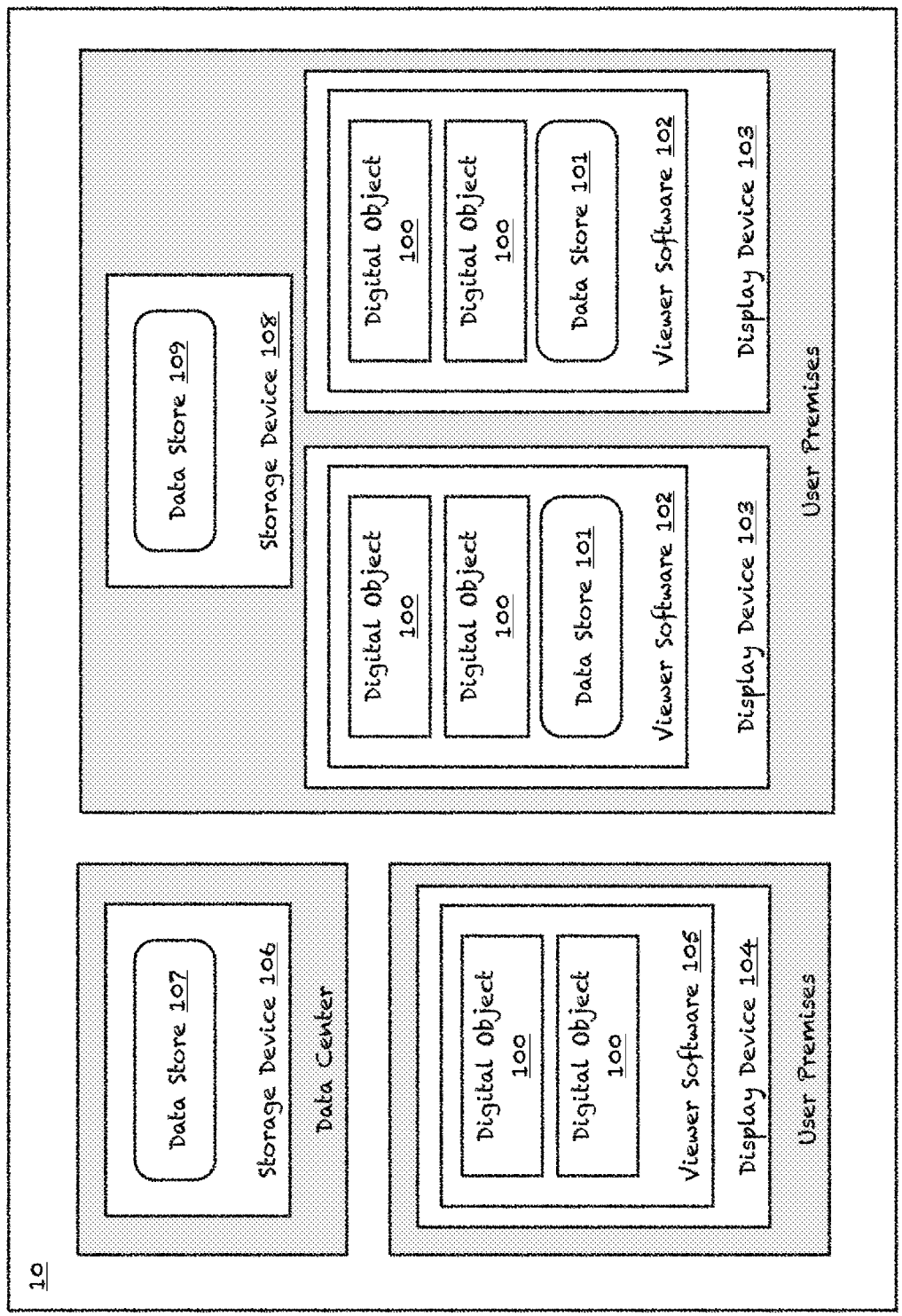
Fig. 1 - System Structure

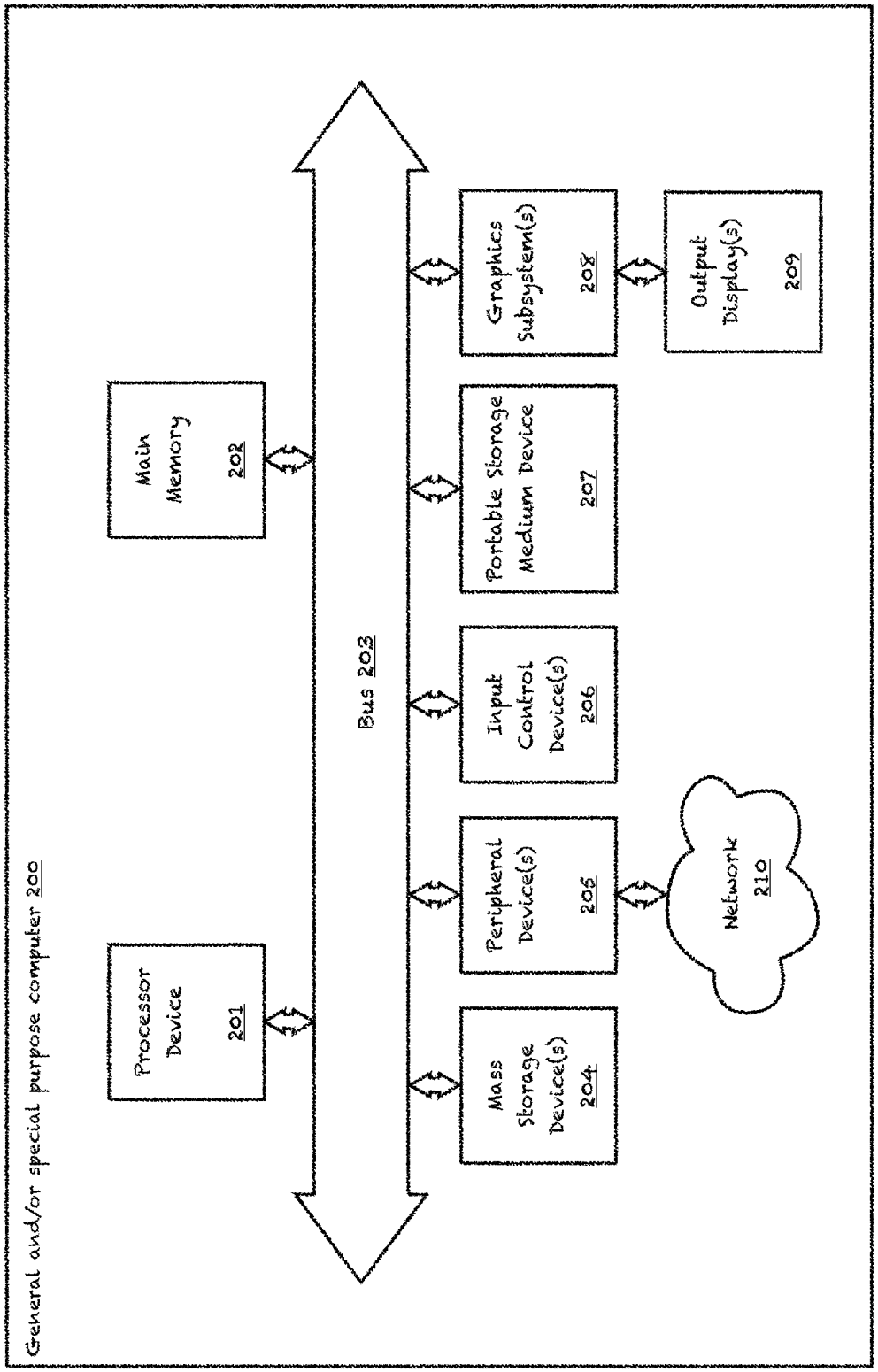
Fig. 2 - Computer Block Diagram

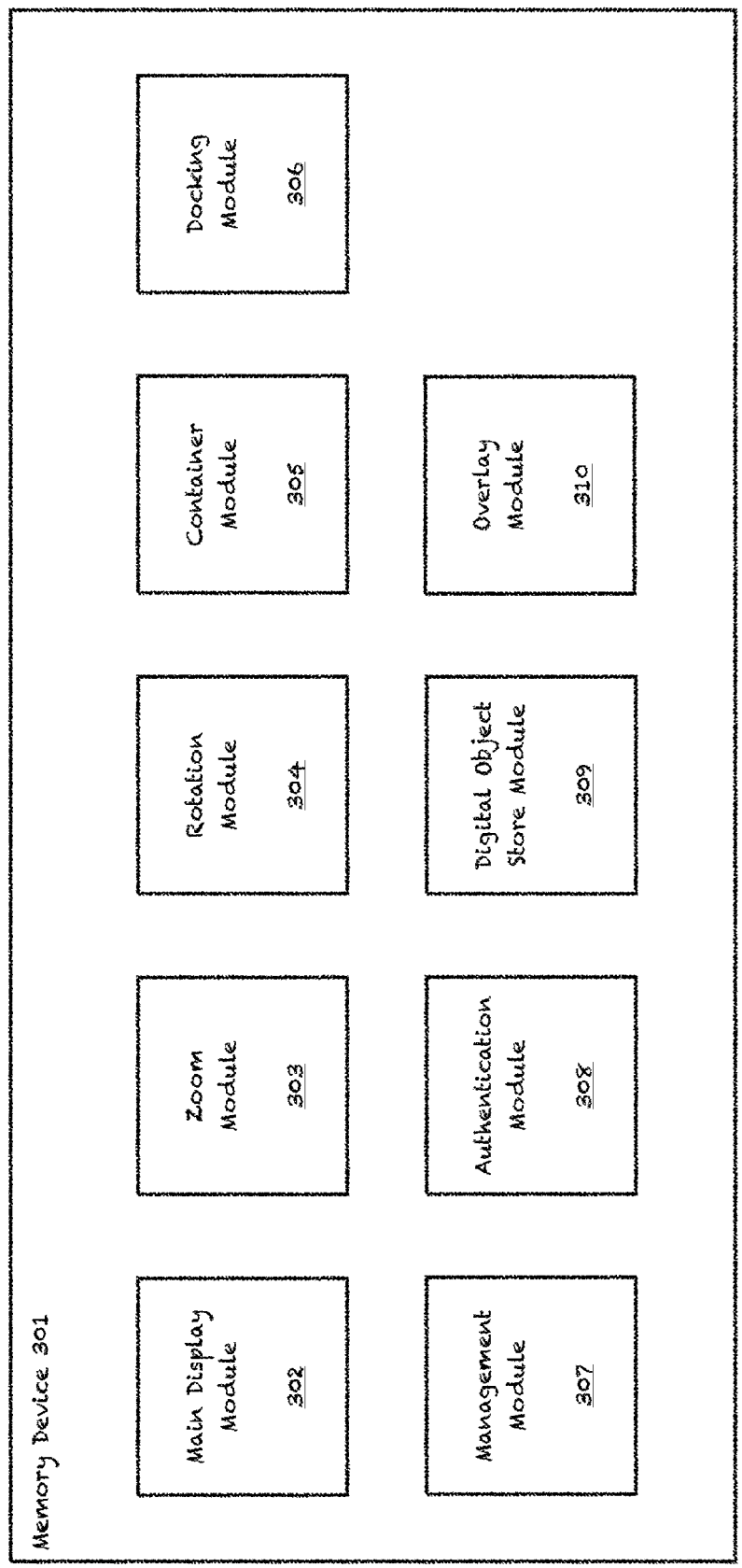
Fig. 3 - System Modules

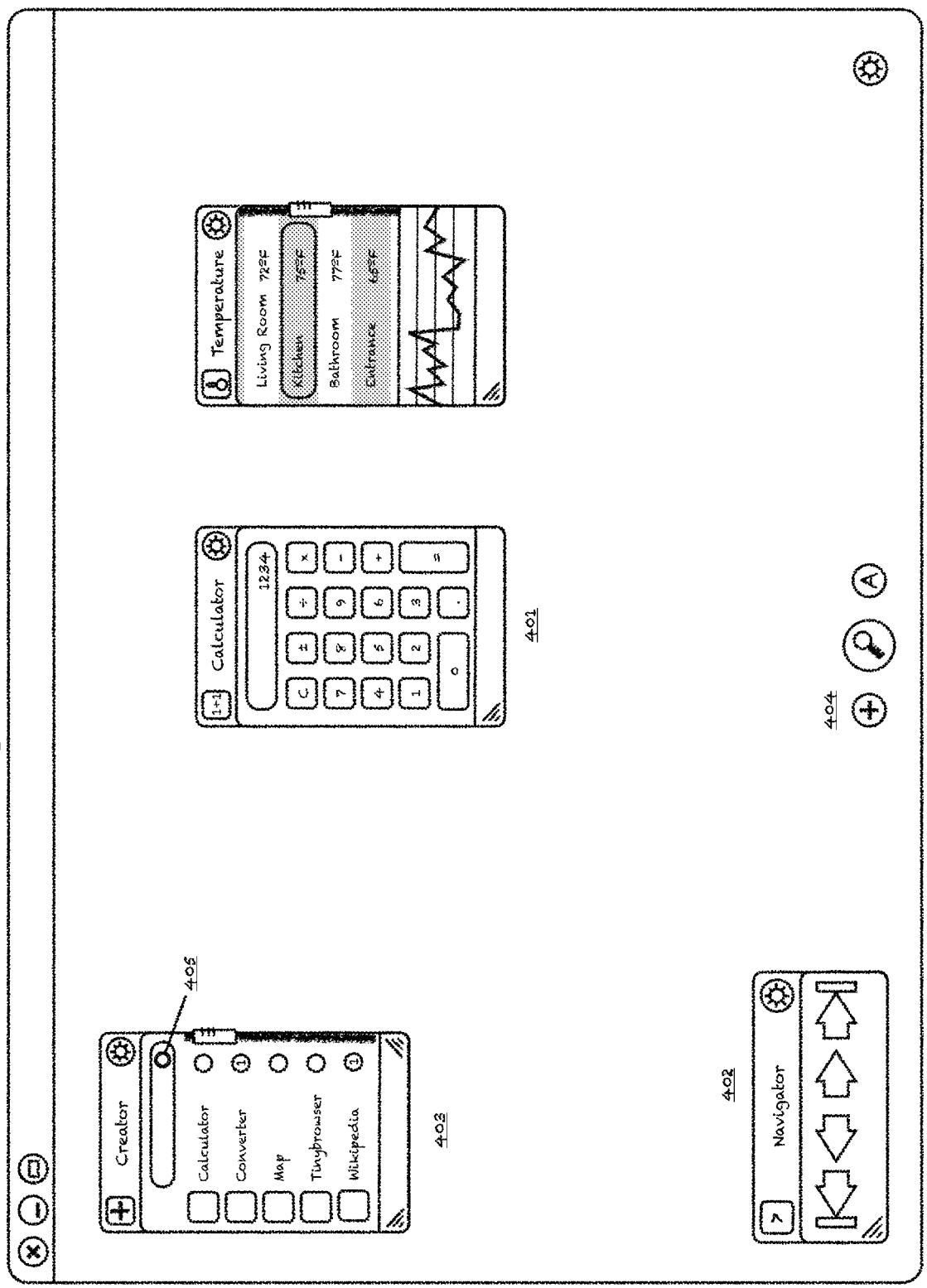

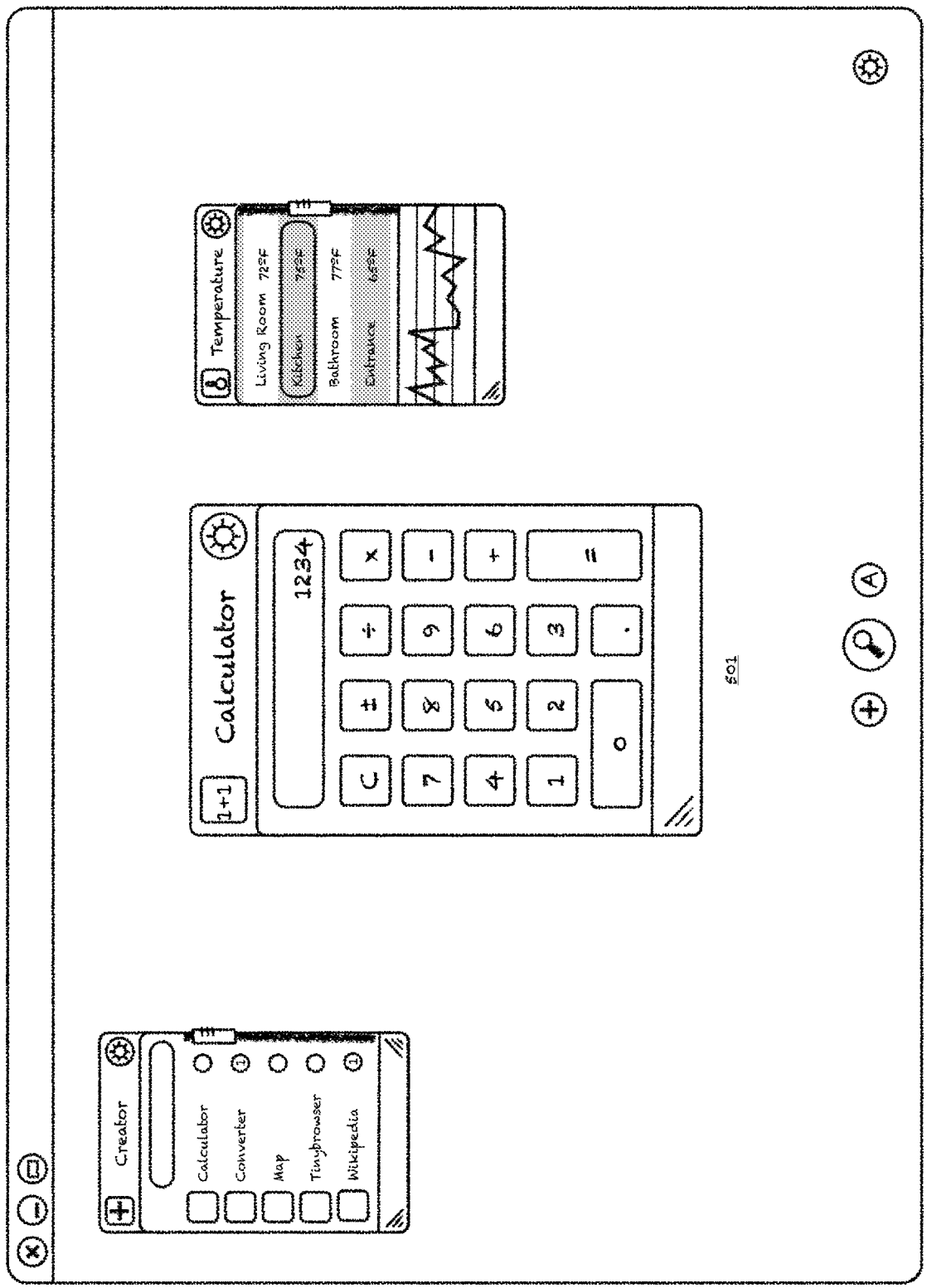

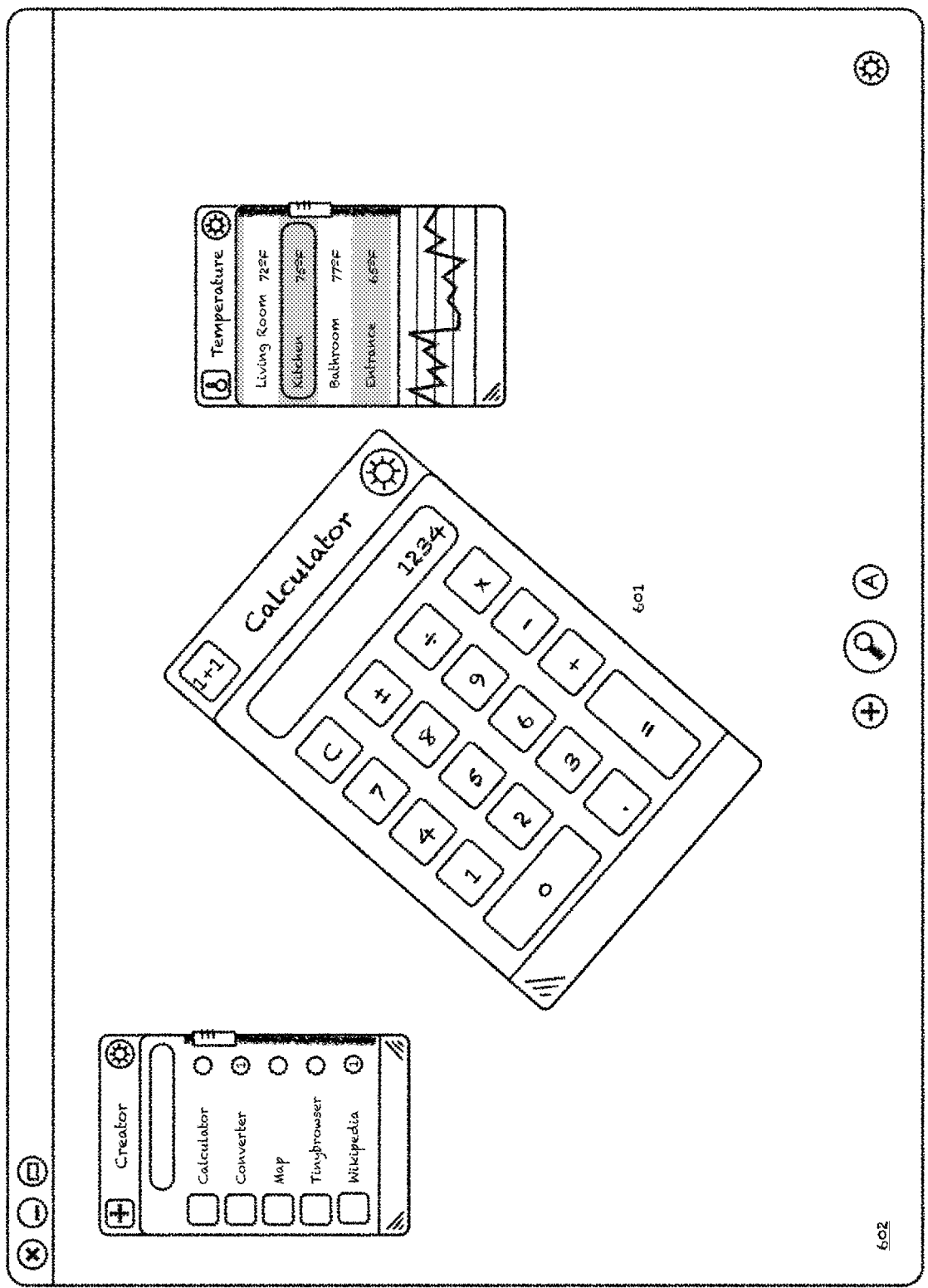
Fig. 6 - Free Rotation

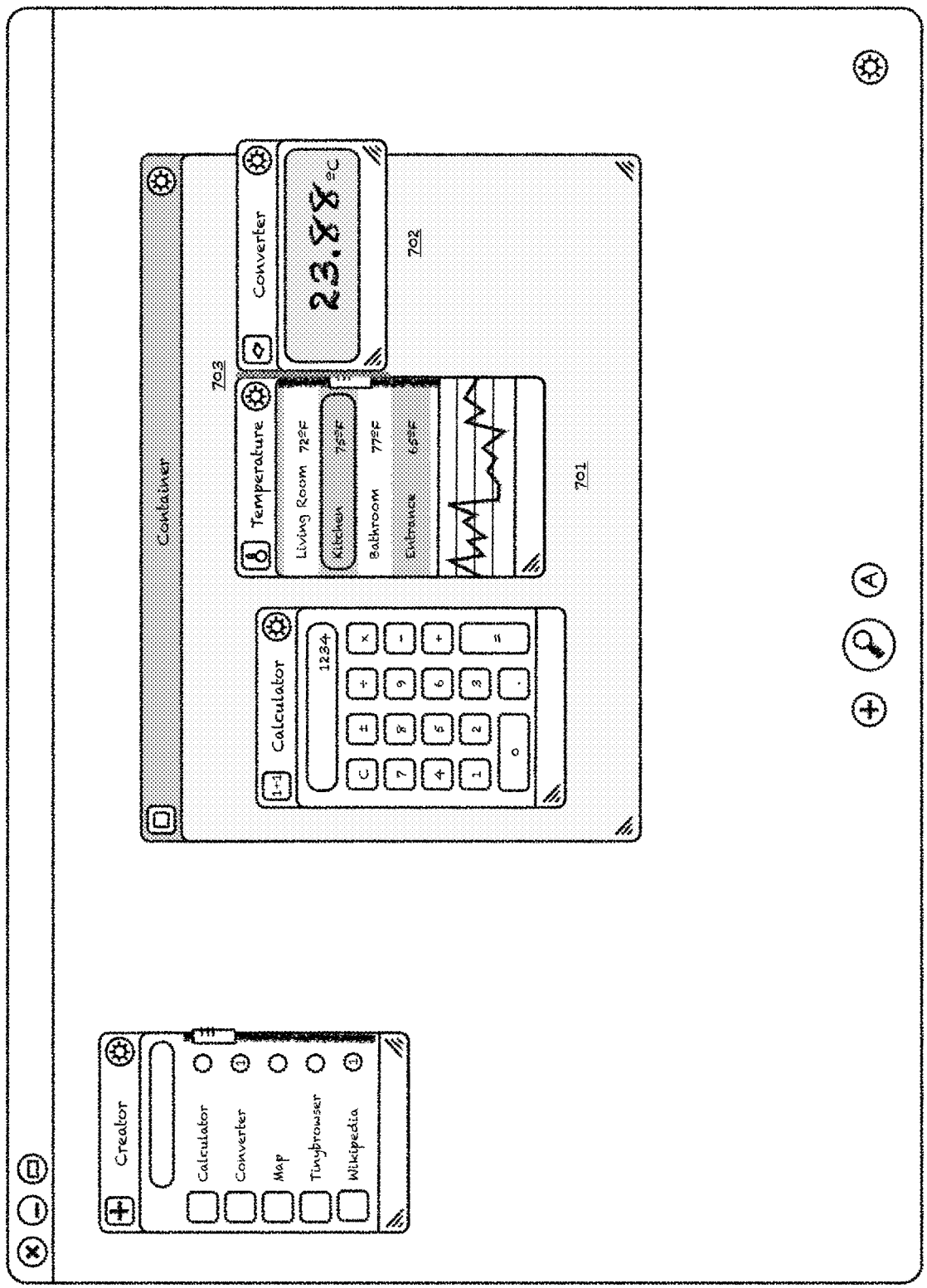

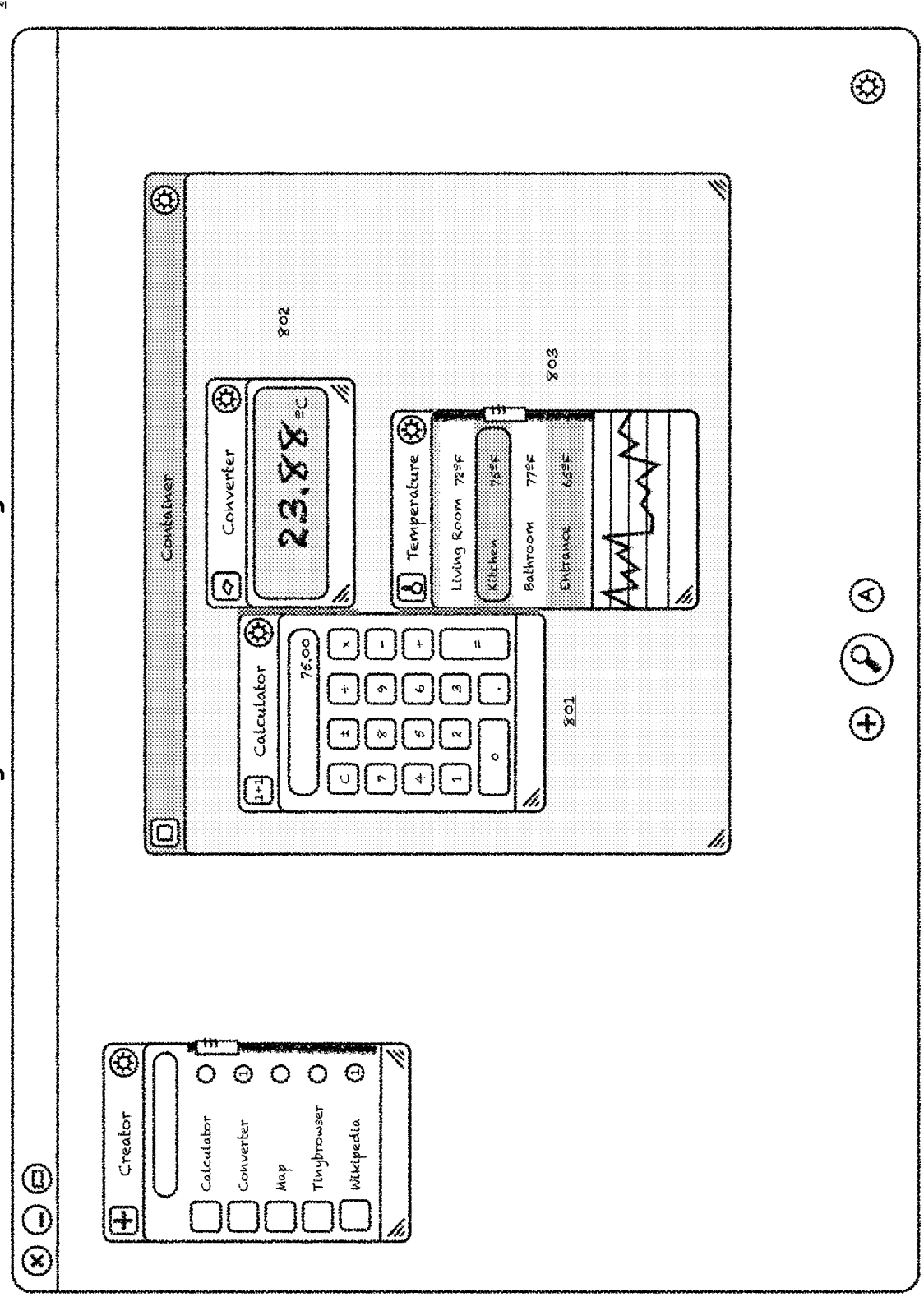
Fig 8. - Docking

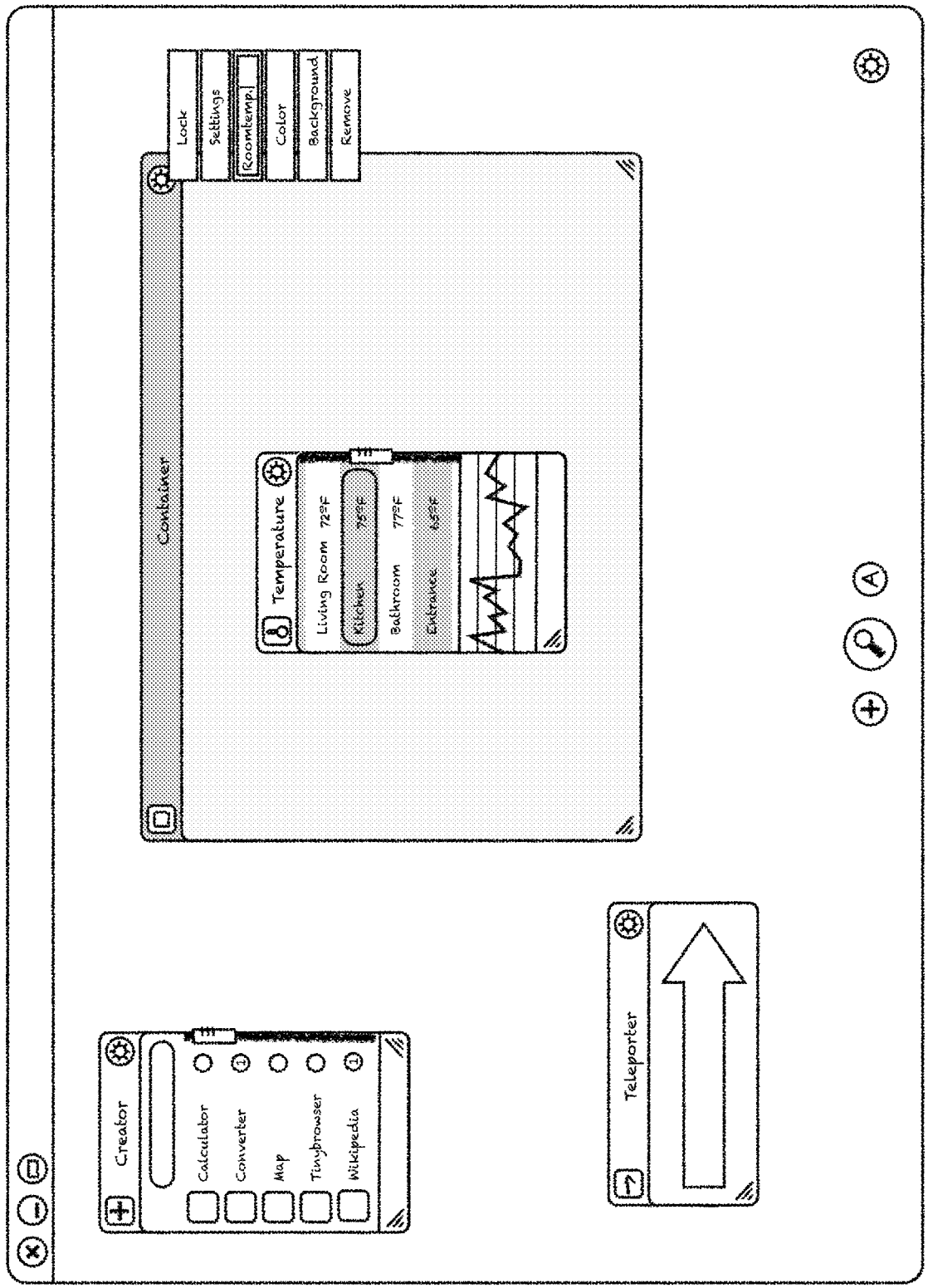
Fig 9. - Naming Objects

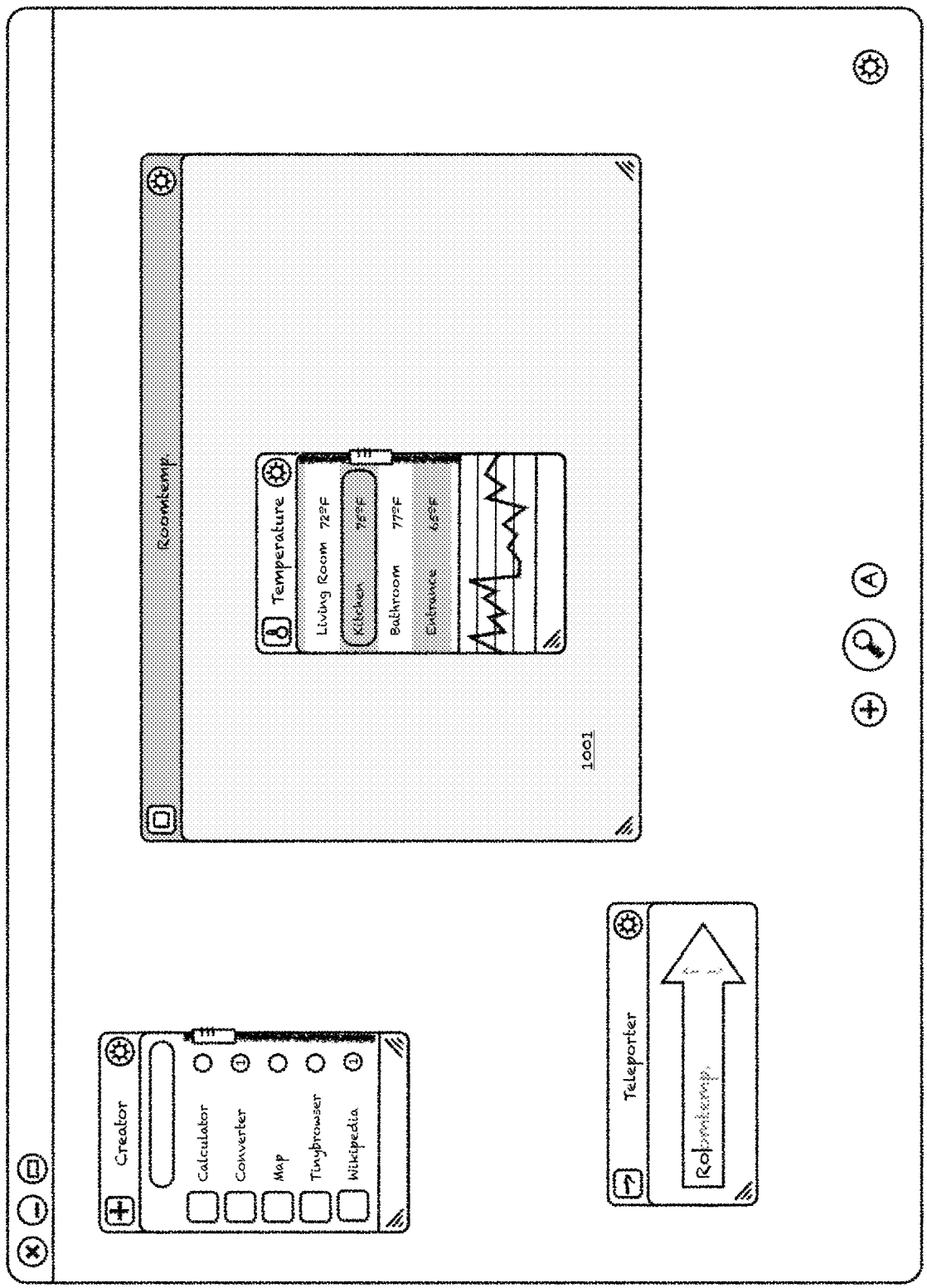

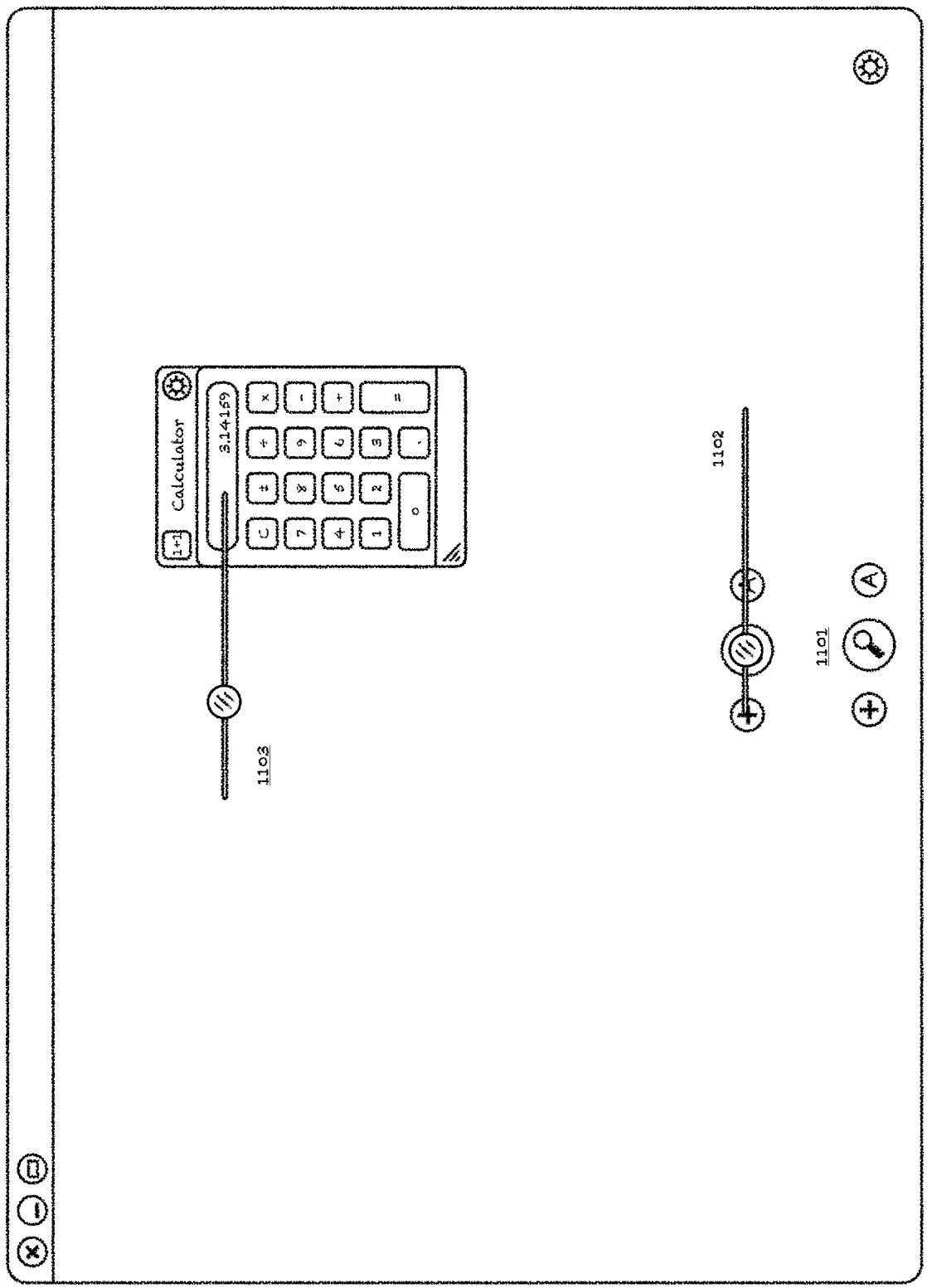
Fig. 11 - Zoom Slider

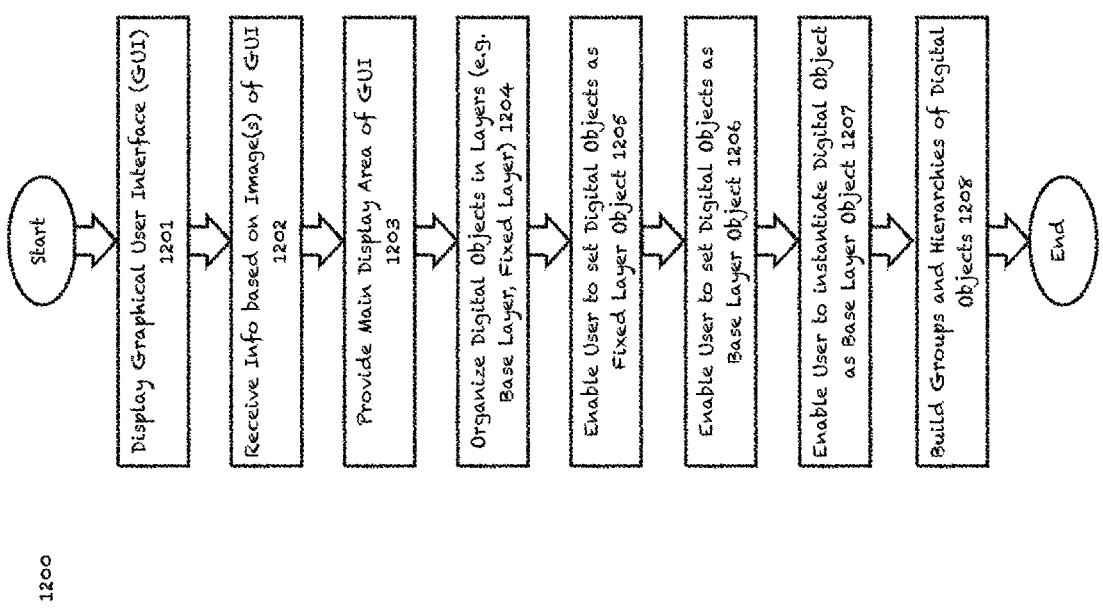

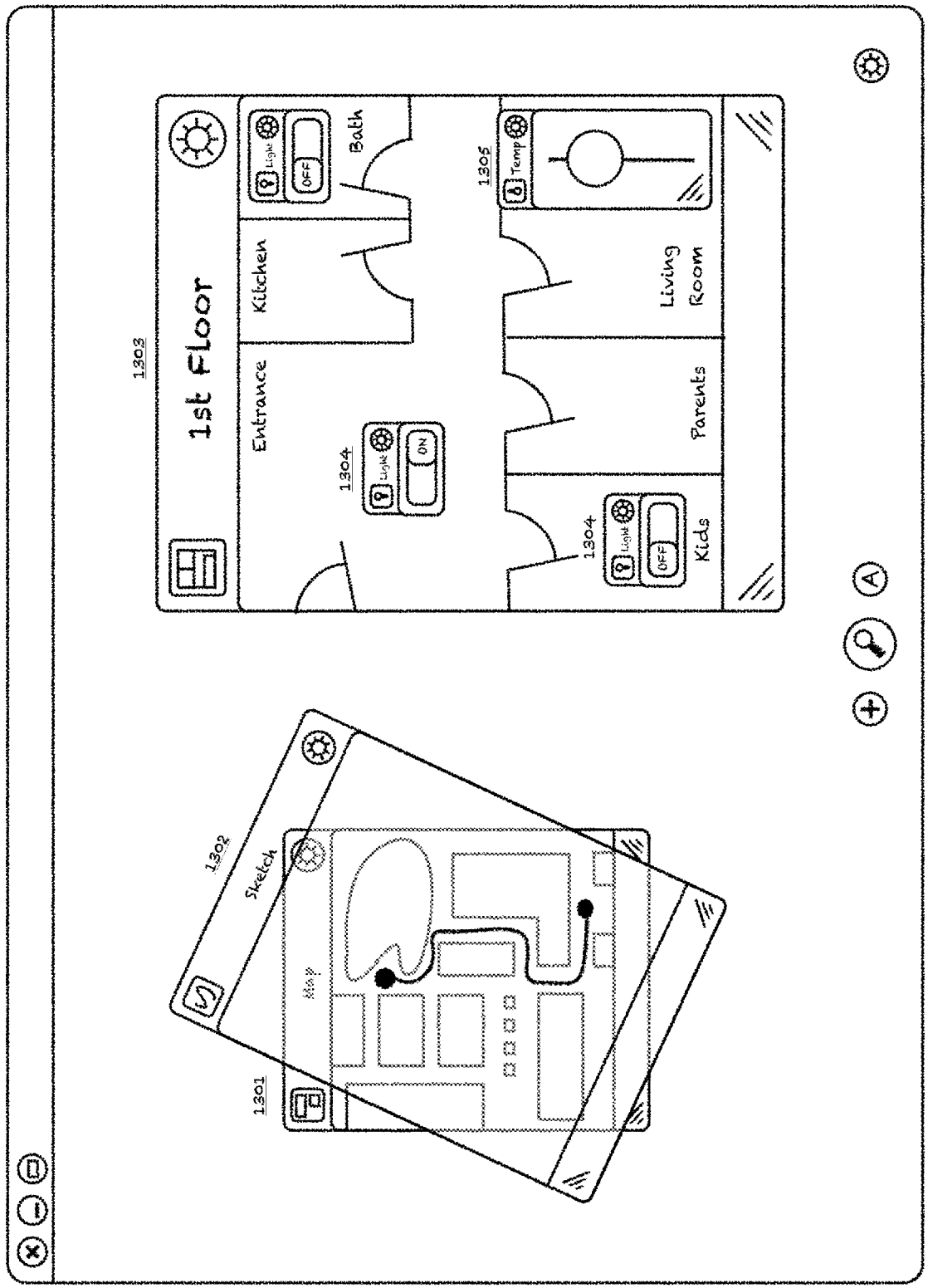

SYSTEM FOR ORGANIZING AND DISPLAYING INFORMATION ON A DISPLAY DEVICE

CROSS-REFERENCE TO RELATED APPLICATION

This application claims the benefit of U.S. Provisional Application No. 61/762,165, filed on Feb. 7, 2013, the entire contents of which are incorporated herein by reference.

BACKGROUND OF THE INVENTION

Field of the Invention

The present application relates to a system for organizing and displaying information on a display device. More particularly, an aspect of the present invention relates to systems, methods, and computer program products for organizing and displaying information on a display, on which a shown object can be manipulated using a pointing device like a mouse, a touch-pad, or a physical pointer, such as a stylus or a user's finger, by gestures executed, and/or by voice commands given by the user.

Description of Related Art

Presently, computer systems are being used to perform an ever-increasing variety of functions that were traditionally provided by tangible items. For example, computer systems are now being used to convey information, such as in books, newspapers, and maps, which were traditionally provided in a paper format. Computer systems also are being used to enable users to enjoy multimedia, such as photographs, music, and videos. Home control features, such as heating control, and remote control of televisions, light switches, alarms, doorbells, and the like, are being performed with the assistance of computer systems. Computer systems also have revolutionized the personal communication and data communications industries.

Given the growing use of computer systems in providing information to users, it would be beneficial to have a sophisticated means of organizing and/or displaying such information that can cover a wide range of needs, and be platform independent, easy to use, and easy to expand.

SUMMARY OF THE INVENTION

The example embodiments herein provide systems, methods, and computer program products for organizing, displaying, and interacting with information on a display device. In accordance with one example aspect herein, a system includes a computer processor and a memory device. The memory device stores at least one piece of computer code executable by the computer processor as well as data used by the computer code. A display device is structured to display a graphical interface to a user based on the computer code executed by the computer processor. One or more input devices are structured to receive information from the user in most cases based on one or more images of the graphical interface displayed on the display device. The computer code includes a main display module for providing a main display area of the graphical interface, and for organizing digital objects in a plurality of layers. The layers include a base layer corresponding to a base-surface situated in a window shown on the main display or covering its entire extent, and a fixed layer corresponding to a fixed-surface in a window on the main display or its entire extent.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments presented herein will become more apparent from the detailed description set forth below when taken in conjunction with the drawings.

FIG. 1 shows an example arrangement of various components of a system for organizing, storing, synchronizing and displaying information on a display device, according to an example embodiment herein.

FIG. 2 is a block diagram of a computer for use with various example embodiments herein.

FIG. 3 illustrates exemplary functional modules that may be included in a memory device and used for organizing, displaying and/or manipulating information on a display surface, according to various example embodiments herein.

FIG. 4 illustrates some digital objects that have been moved and arranged on the base-surface for parallel access.

FIG. 5 illustrates zooming of an object that has been enlarged (zoomed) relative to a previous size, which is shown in a calculator object 401 of FIG. 4, according to an example embodiment herein.

FIG. 6 illustrates an object that has been rotated on the base-surface, according to an example embodiment herein.

FIG. 7 illustrates docking of two objects, according to an example embodiment herein.

FIG. 8 illustrates docking of three objects, according to an example embodiment herein.

FIG. 9 illustrates naming of a digital object using a settings menu and a search input area, according to an example embodiment herein.

FIG. 10 illustrates searching using a search input area, according to an example embodiment herein.

FIG. 11 illustrates zooming using a zoom slider, according to an example embodiment herein.

FIG. 12 is a flowchart showing an example procedure for organizing, displaying and/or manipulating information on a display surface, according to various example embodiments herein.

FIG. 13 illustrates overlaying of multiple digital objects, according to an example embodiment herein.

DETAILED DESCRIPTION

The present invention relates to systems, methods, and computer program products for organizing and displaying information on a display device. The display surface may be a touch-sensitive display surface on which a displayed object can be manipulated using a pointing device like a mouse, a touch-pad, a physical pointer, such as a stylus or a user's finger, or by gestures executed or voice commands given by the user. Optionally, a display surface of the system may be a standard electronic display monitor, a wearable display device like glasses or lenses projecting an image onto the eye of the user, or an image projected onto any kind of surface on which a displayed object can be manipulated using an electronic pointing device, such as a mouse, a touch-pad, a stylus, a user's finger, gestures, voice commands, or the like. The electronic display monitor may be a computer screen, a television monitor, a tablet device, an interactive table or frame, a wearable display device, an image projection on any surface or the like.

The term "viewer" may be used herein to refer to a software portion of a system that enables the user to interact with one or more digital objects.

The term "data store" may be used herein to refer to a software portion of a system that stores data for digital objects. A data store may reside on a display device, on a storage device that is running within a user's premises, or on a storage device that is running remotely.

The term "display device" may be used herein to refer to hardware on which a copy of viewer software is running. A display device may or may not contain local data store software.

The term "storage device" may be used herein to refer to hardware on which a copy of data store software is running.

The term "viewer window" may be used herein to refer to a window provided by viewer software via a display device to enable the user to interact with one or more digital objects.

The term "code bundle" may be used herein to refer to executable source code and/or configuration data that is utilized to instantiate a digital object in a viewer.

The term "digital object" may be used herein to refer to an instance of a code bundle that represents a functional entity having a corresponding set of data stored in a portion of a data tree. Multiple digital objects may be controlled such that they are synchronized with one another.

The term "data tree" may be used herein to refer to a data structure and/or methods provided by a data store to store and deliver data for digital objects.

The term "digital object store" may be used herein to refer to a portion of a system that stores and delivers additional code bundles.

FIG. 1 shows an example arrangement of various components of a system 10 for organizing and displaying information on one or more display devices, in accordance with an example embodiment herein. The system 10 includes display devices 103, 104 on which viewer software 102, 105 is executed. The viewer software allows users to interact with one or more digital objects 100, which represent an instance of a code bundle, as described in further detail below. A code bundle represents a functional entity with its own set of data stored in a portion of a data tree. In particular, a code bundle includes executable source code and configuration data that, in some cases, is required to instantiate a digital object 100 in a viewer software 102, 105. Although not shown in FIG. 1 for purposes of convenience, the data trees are structures and methods that are stored in data stores 101 and that store and provide data for digital objects 100. The system 10 also includes storage devices 106, 108 on which various ones of the data stores 101 are replicated.

In order to handle multiple digital objects arranged on a single base layer of a device, a rendering process of the digital objects is optimized by using caching algorithms. Whenever a digital object is to be drawn, for example, because there is new data to show in connection with the object, the new content will be drawn as a bitmap in an invisible buffer, using a current zoom level. The bitmap will be cached (e.g., stored in memory) and used to draw the digital object when required, instead of rendering content over and over again when the object has to be redrawn. Additionally, if a digital object is not visible within the main drawing area or the object has been iconized before or during a zoom operation, then the object will not be rendered. Rather, a previously cached bitmap will be used to draw the object when required. Later, if the system is idle, then objects will be re-rendered if required to match the resolution or zoom level of the display surface.

In accordance with another example embodiment, data that is required in an object at a later time or a different place is made persistent by being temporarily stored in a large internal data tree. Each object has a corresponding key that the object provides to the data tree in order to be granted access to store data therein and/or retrieve data therefrom.

Various portions of the data tree are available to a digital object. A first, private portion of the data tree is available only to a particular instance of an application (e.g., a digital object). The private portion of the data tree is used to store and access data that is not intended to be shared with other objects. A second, public portion of the data tree exists for each digital object, which the digital object can use in order to exchange data with other digital objects. For example, the public portion of the data tree can be used to exchange data between docked objects (explained further below). A third portion of the data tree is available separately for each digital object. The third portion stores information about the corresponding object's size, color, rotation, position, and other attributes. A fourth portion of the data tree, referred to as a local tree, makes data available to all digital objects that are running on a particular display surface. The fourth portion of the data tree is used to share data among all objects running in one location. A fifth portion of the data tree makes all attributes of the main display area (e.g., size, color, rotation, position, etc.) available to all local digital objects.

In one example embodiment, when an instance of a digital object is removed (e.g., un-instantiated) from the system, the private portion and the public portion of the data tree that were allocated for the object are removed from the system. In this way, valuable memory space is conserved by avoiding memory leaks that would otherwise consume memory space for objects that are no longer instantiated.

Because portions of the system supplying data trees are independent of a display surface and digital objects are allowed to easily access data trees from the display surface they are located on, the system allows for efficient synchronization of digital objects distributed across multiple display surfaces and/or locations. Data stores are the portions of the system that store and provide the data trees, and may reside on any device connected to any network that can be accessed from one or more display services. The system also allows for a portion of a data tree to be linked to a remote source in addition to keeping a copy of the data tree in a local cache, for example, for redundancy purposes.

FIG. 2 is a block diagram of a general and/or special purpose computer system 200 that may be employed in accordance with some of the example embodiments herein. The computer system 200 may be, for example, a user device, a user computer, a client computer and/or a server computer, among other things.

The computer system 200 may include, without limitation, a computer processor 201, a main memory 202, and an interconnect bus 203. The computer processor 201 may include without limitation a single microprocessor, or may include a plurality of microprocessors for configuring the computer system 200 as a multi-processor system. The main memory 202 stores, among other things, instructions and/or data for execution by the processor device 201. The main memory 202 may include banks of dynamic random access memory (DRAM), as well as cache memory.

The computer system 200 may further include mass storage device(s) 204, peripheral device(s) 205, input control device(s) 206, portable storage medium device(s) 207, graphics subsystem(s) 208, and/or one or more output display(s) 209. For explanatory purposes, all components in the computer system 200 are shown in FIG. 2 as being coupled via the bus 203. However, the computer system 200 is not so limited. Devices of the computer system 200 may be coupled via one or more data-transport devices known in the art. For example, the computer processor 201 and/or the main memory 202 may be coupled via a local microprocessor bus. The mass storage device(s) 204, the peripheral device(s) 205, the portable storage medium device(s) 207, and/or the graphics subsystem(s) 208 may be coupled via one or more input/output (I/O) buses. The mass storage device(s) 204 may be nonvolatile storage device(s) for storing data and/or instructions for use by the computer processor 201. The mass storage device(s) 204 may be implemented, for example, with one or more magnetic disk drive(s), solid state disk drive(s), and/or optical disk drive(s). In a software-related embodiment, at least one mass storage device 204 is configured for loading contents of the mass storage device 204 into the main memory 202.

Each portable storage medium device 207 operates in conjunction with a nonvolatile portable storage medium, such as, for example, a compact disc with a read-only memory (CD-ROM) or a non-volatile storage chip (Flash), to input and output data and code to and from the computer system 200. In some embodiments, the software for storing an internal identifier in metadata may be stored on a portable storage medium, and may be inputted into the computer system 200 via the portable storage medium device 207. The peripheral device(s) 205 may include any type of computer support device, such as, for example, an input/output (I/O) interface configured to add additional functionality to the computer system 200. For example, the peripheral device(s) 205 may include a network interface card for interfacing the computer system 200 with a network 210.

The input control device(s) 206 provide among other things, a portion of the user interface for a user of the computer system 200. The input control device(s) 206 may include a keypad, a cursor control device, a touch sensitive surface coupled with the output display(s) 209 or standalone, a camera, a microphone, infrared sensors, knobs, buttons, and the like. The keypad may be configured for inputting alphanumeric characters and/or other key information. The cursor control device may include, for example, a mouse, a trackball, a stylus, and/or cursor direction keys. In order to display textual and graphical information, the computer system 200 may utilize the graphics subsystem(s) 208 and the output display(s) 209. The output display(s) 209 may include a cathode ray tube (CRT) display, a liquid crystal display (LCD), a projector device, and the like. Each graphics subsystem 208 receives textual and graphical information, and processes the information for output to at least one of the output display(s) 209.

Each component of the computer system 200 may represent a broad category of a computer component of a general and/or special purpose computer. Components of the computer system 200 are not limited to the specific implementations provided here.

Portions of the example embodiments of the invention may be conveniently implemented by using a conventional general purpose computer, a specialized digital computer, and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein, which can be used to control, or cause, a computer to perform any of the procedures of the example embodiments of the invention. The storage medium may include without limitation a floppy disk, a mini disk, an optical disc, a Blu-ray Disc™, a DVD, a CD-ROM, a micro drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the general and/or special computer or microprocessor, and for enabling the computer or microprocessor to interact with a human user or other mechanism utilizing the results of the example embodiments of the invention. Such software may include, without limitation, device drivers, operating systems, and user applications. Additionally, such computer readable media further includes software for performing example aspects of the invention, as described herein.

Included in the programming and/or software of the general and/or special purpose computer or microprocessor are software modules for implementing the procedures described herein.

Having described a general and/or special purpose computer that may be employed in accordance with some of the example embodiments herein, reference will now be made to FIG. 3, which illustrates example functional modules that may be included in a memory device 301, in accordance with example embodiments herein. In some example embodiments, the memory device 301 is included in the computer system 200, described above in connection with FIG. 2, further represents the main memory 202 in part or in whole, and is used for organizing, displaying, and/or manipulating information on a display device or surface. For example, although not shown in FIG. 3 for purposes of convenience, the memory device 301 is coupled to a computer processor (e.g., the computer processor 201) that, in turn, is coupled to one or more display surfaces (e.g., the output display(s) 209) and optionally to one or more capabilities to exchange data over a network (e.g., the network 210) or on dedicated connections. In one example embodiment, each display device 209 is structured to display a graphical interface (e.g., a GUI) to a user based on computer code (e.g., modules 302 through 310) executed by the computer processor 201. An input device (e.g., the input control device 206) is structured to receive information from the user based on one or more images of the GUI displayed on the display device 209.

As shown in FIG. 3, the modules stored within the memory device 301 include a main display module 302, a zoom module 303, a rotation module 304, a container module 305, a docking module 306, a management module 307, an authentication module 308, a digital object store module 309, and an overlay module 310. As will be described in further detail below, each of the modules 302 through 310 includes computer-executable code that imparts functionality to the computer system 200 when executed by the computer processor 201 as well as data related to that code. Additionally, the memory device 301 stores computer programs and data for applications that a user may interact with via display surface(s).

The main display module 302 provides a main display area of the graphical interface for the display surface. The main display area may cover all or a part of the display surface. The main display module 302 organizes digital objects on the main display area. Each digital object corresponds to a running interactive software application. The digital objects can represent at least one of: (1) a (collaborative) document (which may contain any one or a combination of text, one or more images, one or more videos, and/or one or more animations), (2) a media player (for playing music content, video content, and/or streaming media data), (3) a home appliance or device controller, (4) a game, (5) a navigation tool for revealing one or more particular portions of the main display area, (6) a social networking tool for providing access to a social network, (7) a reference tool, such as a dictionary, thesaurus and/or an encyclopedia, (8) a container for associating a plurality of digital objects into a group, for enabling the group to be displayed as an icon or in full size and function, and/or for connecting and synchronizing the group with a remote display device (9) a spreadsheet, (10) a calculator, (11) a web page being provided by an Internet website, (12) a photo album, (13) a camera, (14) virtual TV set, (15) a newspaper/newsfeed, (16) a book, (17) an e-mail client, (18) a slideshow display, (19) a door opener button, (20) a to-do list, (21) a drawing and sketching pad, (22) a text message sending element, (23) an element that shows detailed information about the software running, (24) a map, (25) a product catalog, (26) an element to search and browse images from the Internet, (27) a form for, for example, providing feedback about a subject, (28) a poll result from votes coming from an audience, (29) a simple visual programming element, (30) a recipe collection, (31) an address book, (32) a calendar, (33) a diary, (34) a time-table for, for example, for public transportation, (35) a phone directory, (36) a language translator, (37) a barcode/QR-code display, (38) an element to search and instantiate other digital objects, (39) an element to browse through and instantiate digital objects from a remote site, (40) an element enabling the user to control a general remote device, and (41) an element to receive and display data from a general remote device. A digital object appears in the main display area in an iconized state or a fully displayed state, and the main display module 302 enables the user to change the digital object to and from the iconized state and the fully displayed state. The main display module 302 enables the user to change a position of a digital object in the main display area (e.g., by providing a dragging input with a mouse, stylus, finger, or the like) without changing a position of another digital object in the main display area. When the digital object appears in the fully displayed state in the main display area, the digital object may be locked to prevent it to be moved, rotated, renamed, colored, or zoomed.

The main display module 302 organizes the digital objects on the main display area in a plurality of layers, including a base layer and a fixed layer. Two or more digital objects may be synchronized with each other, such that manipulation of one affects the appearance and/or operation of the other(s). The base layer corresponds to a base-surface of the main display area. An appearance of one or more base-layer objects on the base-surface may be selectively altered by the user. The fixed layer corresponds to a fixed-surface within the main display area. In other words, the fixed layer can appear to be fixed and floating above the base layer within the main display area. The fixed layer allows the user to have certain objects arranged on it separately. An appearance of one or more fixed-layer objects on the fixed-surface is fixed or pinned when an appearance of a base-layer object is altered by the user. In other words, objects arranged on the fixed layer are not zoomed, rotated, or moved when the base layer changes zoom level, rotation, or position. In this way, the objects arranged on the fixed layer are available to the user independent of the base layer.

The user has the flexibility to select which objects are arranged on the fixed layer, if any at all. The main display module 302 enables the user to (1) selectively pin and unpin a digital object to the fixed-surface window as a fixed-layer object, (2) set a digital object as a base-layer object displayed on the basic-layer, (3) change a base-layer object to a fixed-layer object, (4) change a fixed-layer object to a base-layer object, and (5) create a group of base-layer objects, such that an appearance of the group of base-layer objects may be altered as a group.

In one example aspect, the main display module 302 also enables the user to (1) move, zoom, and rotate a base-layer object on the base-surface; (2) move, zoom, and rotate the base-surface within the main display area relative to a position of the fixed-surface window; and/or (3) selectively set a position of the fixed-surface window within the main display area.

Additionally, the user may set a color or define a high resolution image as a background for a digital object, rename it, control its transparency and, if set by the developer of the object, change the side ratio of the digital object.

Additionally, the base layer, including all objects it carries, may also be rotated and zoomed independently of an orientation of the display surface. The part of the base layer visible within the main display area can also be controlled by moving this layer relative to a rectangle of the main display area. It is also possible to set a color or define a high resolution image as a background for the base layer.

In another example aspect herein, the main display module 302 enables the user to create a first group of base-layer objects different from a second group of base-layer objects, such that an appearance of the first group of base-layer objects may be altered in unison without altering an appearance of the second group of base-layer objects.

In a further example embodiment, the computer system 200 further includes a communication interface for connecting the computer processor 201 to at least one of (1) an apparatus connected to the computer system 200 via a dedicated communication line, to allow the computer system 200 to receive information from and send information to the apparatus; (2) a local area network (e.g., the network 210), to allow the computer system 200 to receive information from and send information to one or more other systems connected to the local area network; and/or (3) an Internet service provider, to allow the computer system 200 to receive information from and send information to an Internet address. The communication interface is configured to perform at least one of wireless communication and/or wired communication.

According to another example aspect, the input device 206 includes at least one of (1) a touch-sensitive sensor arrangement structured to receive pressure produced by the user on the display device, (2) a sound and voice receiver structured to receive sounds and/or commands produced by the user, (3) an electronic pointing device structured to be manipulated by the user to provide commands based on a location of a cursor on the display device, and (4) one or more cameras to recognize gestures, mimics, and moves a user may produce in front of it/them as well as other optical information like infrared signals and/or brightness information.

In a further aspect, the main memory 202 stores code bundles, each code bundle including executable code and configuration data for instantiating a corresponding digital object on the display device. Code bundles are small directory structures containing several code units, media resources like videos, images, sounds, and the like, and structured information about the code bundle. The directory structure of a code bundle may be provided as a compressed file and may optionally be encrypted to bind it to a particular display device or a particular user.

In some example embodiments, the display device can be at least one of (1) a touch-sensitive display surface that receives user input by sensing physical contact, and/or (2) an electronic display monitor that receives user input via at least one of a pointing device, gestures or mimics, and/or a voice command or any other signal delivered to one of the input control device(s) 206.

In a further example embodiment, a digital object may be moved, rotated, or zoomed by the user via at least one of (1) a swipe motion executed on the touch-sensitive display surface, (2) a tap on the touch-sensitive display surface, (3) a drag motion of the pointing device, (4) a click of the pointing device, (5) a spoken command, and/or one or more gestures executed by the user. When the digital object is moved, rotated, or zoomed, a visible appearance of the digital object transitions smoothly from an initial appearance to a final appearance.

In one example embodiment, the zoom module 303 enables the user to alter a size of at least one of: (1) a base-layer object, (2) a group of base-layer objects, (3) all base-layer objects, and/or (4) a viewable area of the base-surface window, displayed on the display device. For example, FIG. 5 shows a calculator object 501 that has been enlarged (zoomed) relative to a previous size, which is shown in the calculator object 401 of FIG. 4. By enabling the size of various objects to be altered, the zoom module 303 enables large quantities of objects to be arranged and organized within a limited amount of space available on a physical display surface, while still enabling the user to navigate from one object to another smoothly and with minimal effort.

The zoom module 303 is configured to provide various ways to control the zoom level as well as the visible area of the base level. In one example embodiment, the zoom module 303 is configured to provide at least one of (1) one-command zooming, such that a single command issued by the user and received by the input device causes zooming to a predetermined size and a predetermined position; (2) a sliding zoom scale, which enables the user to change the size smoothly and continuously in accordance with a slide position of the sliding zoom scale, the slide position being smoothly and continuously changeable by the user via the input device; and (3) a zoom-level changer, which enables the user to smoothly and incrementally change the zoom level.

One example procedure for zooming in and out of the base layer is by executing a double-click (e.g., on a mouse) or a double-tap using a finger or a stylus at any position on the surface, and remaining in a clicked position or a tapped position for at least a predetermined amount of time after the double-click or double-tap. This will cause a zoom slider to appear at this particular position (e.g., 1103 in FIG. 11) with the control button right at click location. In this case the center of the zoom will be the point at which the user started the interaction In another example embodiment, the zoom module 303 enables the user to cause the sliding zoom scale to appear and disappear from the main display area by at least one of (1) a tap input, (2) a swipe input, (3) a click input, and/or (4) a voice-command input. When the sliding zoom scale appears in the main display area, the slide position of the sliding zoom scale is at a position corresponding to a current size of the base-surface window. The zoom module 303 enables the user to cause the sliding zoom scale to appear and disappear from the main display area by a tap input or a click input. A position of the tap input or the click input can be used to designate a position at which the sliding zoom scale appears in the main display area. Optionally, the zoom module 303 is configured to display the sliding zoom scale at a predetermined position in the main display area. For example, if the object selected is not yet centered in the main display area and not zoomed to fit the area in an optimal way, the zoom module 303 can shift and zoom the base layer to center and zoom the object in the main display area to fit in an optimal way. If the base layer has been shifted and zoomed to this state before, another double-click or double-tap causes the position and zoom level to revert back to their state before the first double click. In another example aspect, zooming in on an object also causes the entire base layer to automatically rotate in a way that makes the object appear in an upright position. Another double-click or double-tap causes the rotation to revert back to its state before the first double-click and back to the original orientation of the base layer at the second click. The zoom module 303 enables the user to change the zoom level by at least one of (1) a tap input, (2) a click input, (3) a gesture input, and (4) a voice-command input.

As shown in FIG. 11 the zoom module 303 enables the user to tap or click an overview button 1101 at the bottom of the display area. This will cause the zoom module 303 to zoom, rotate and pan the base layer to show all digital objects placed on it at the same time at the largest zoom level.

Additionally if the user presses the overview button 1101 for more than a normal click/tap, the zoom module 303 to display a zoom slider 1102 at this particular point. In this case the center of the zoom will be the center of the visible part of the base surface.

The rotation module 304 enables the user to alter a rotational orientation of at least one of (1) a base-layer object, (2) a group of base-layer objects, (3) all base-layer objects, and (4) a viewable area of the base-surface, displayed on the display device. In one example embodiment, the rotation module 304 enables the user to change a rotational orientation of a base-layer object to an arbitrary angle without changing a rotational orientation of another base-layer object. For example, FIG. 6 shows a calculator object 601 that has been rotated within a base-surface window 602. The rotation module 304 also enables the user to change a rotational orientation of a group of base-layer objects to an arbitrary angle without changing a rotational orientation of the viewable area of the base-surface window.

In one example embodiment, the user is enabled to rotate and zoom a digital object in one coherent movement. This is achieved by combining zooming and rotating of digital objects as provided by the zoom module 303 and the rotation module 304 into one specific gesture that may be allocated for example to an area on a corner of every digital object. Clicking or touching this area with a pointing device like for example a stylus, a mouse, or a user's finger on a touch surface and dragging it from there, allows to zoom and rotate a digital object in one movement. The position opposite of the dragging area of the digital object being zoomed and rotated is used as an anchor point for this particular gesture.

The gesture described here is different in purpose and function from the one used to resize (not zoom) the content area and the ratio of height and width of a digital object as offered for objects on screens of traditional systems. It also differs from a gesture often used in traditional systems that needs two points on screen to be selected in order to zoom and/or rotate an object. Reducing the number of touch points from two to one allows the same gesture to be used for zooming and rotation with a user's finger on a touch surface as well as with a pointing device like a stylus or a mouse.

In one example embodiment, the user is enabled to navigate (manually or automatically) through several configurations predetermined by the user, each configuration having a predetermined zoom level and a predetermined rotation for one or more digital objects. The user may manually navigate through the configurations by providing an input via a digital navigator object 402, remote control, a spoken command (e.g., "next," "previous," etc.), a gesture, and/or the like. Or the configurations may be automatically navigated through in response to an application running on a different device issuing one or more commands to the computer system 200.

One type of digital object is referred to as a container 1001. A container is an application that provides an area on which other objects can be arranged to enable them to be manipulated as a group. Containers are handled by the container module 305, which enables the user to associate a plurality of digital objects into a group (see, for example, FIG. 7), such that a change in size, rotation, or position of the group causes a corresponding change in size, rotation, or position of each of the plurality of digital objects in the group. The user may designate a group of digital objects to be a hierarchy (discussed below), and give the container a name of his choice. When the user subsequently selects to utilize the hierarchy, a single selection of the user-given name causes all of the objects of the hierarchy to be launched for use.

A container 1001 may also be configured to represent another display device accessible to the user. This allows the simple exchange of digital objects between the local display device and the remote device by dragging object from the local surface to the container configured to represent the remote device and vice-versa.

In another example embodiment, an Internet browser object is provided that enables a user to access the Internet from within the computer system 200. In this way, one or more live views of a website can be used interactively, or as an integrated part of a presentation on stage, in one example.

The docking module 306 enables the user to dock a first digital object with a second digital object to form first and second docked digital objects that are operatively linked together. The first and second digital objects correspond to first and second interactive software applications, respectively. Data produced by the first interactive software program corresponding to the docked first digital object is used by the second interactive software applications corresponding to the second digital object to produce a combined output. For example, when a room temperature object is docked with a general unit conversion application, the user can select to have temperatures, which may be presented in degrees Fahrenheit as the default unit, automatically converted to a desired unit (e.g., Kelvin, Celsius, etc.).

According to one example aspect, illustrated in FIG. 7, a first digital object 701 is docked with a second digital object 702 based on a touching position 703 of the first digital object relative to the second digital object in the base-surface window (e.g., aligning the edges of the first and second digital objects). In an example embodiment, if the first and second digital objects are able to communicate, the user will be presented with visual feedback when the two digital objects are positioned near each other. For example, FIG. 7 shows a container with a room temperature object 701 docked with a unit converter object 702. FIG. 8 shows a container with a calculator object 801 docked with a unit converter object 802 and a room temperature object 803.

In another example aspect, the first digital object is undocked from the second digital object based on a spaced-apart position of the first digital object relative to the second digital object in the base-surface window.

The management module 307 controls and manages the flow of data between the digital objects 100 in FIG. 1 and the local storage and caching facilities 101 provided for the viewer software 102 on local display devices 103 that do offer local storage. An optional local storage device 108 providing an additional data storage 109 may be used to synchronize data between the local display devices 103 within the user's premises. Without the local storage device 108, the viewer software 102 could as well use the remote storage device 106.

In another option, if the management module 307 of the viewer software 105 on a display device 104 is not able to provide local data storage to store digital object data persistently, it may use a local storage device 108 located on the user's premises or may store the data on a storage device 106 that is running remotely and accessed via the Internet. In both cases, the storage devices 106, 108 are considered to be part of the system 10 and are, based on their data stores 107, 109, providing the same set of services to the viewer software 102, 105 as the set of services that can be provided by the data stores 101.

The management module 307 allows the user to manage a repository of digital objects selectable for use, either on a local system or a data store accessible by the viewer.

In particular, the management module 307 includes a main digital object 403 (see FIG. 4) that manages access by the user to the repository of previously installed code bundles. The main digital object 403 providing this access may be hidden or revealed in the main display area in accordance with a command inputted by the user via one or more input buttons 404. The main digital object 403 is a user interface for an interactive software application that provides a menu of the digital objects in the repository selectable by the user to be a base-layer object. The main digital object 403 also provides a menu of hierarchies of digital objects in the repository selectable by the user. Digital objects belonging to a hierarchy share a common characteristic, such that a selection of a hierarchy from the menu results in a submenu of digital objects belonging to the selected hierarchy to be provided for selection by the user to be a base-layer object.

The main digital object also provides a search input area 405 for the user to input a search term to search for a digital object in the repository.

A digital object of the repository selected by the user via the main digital object 403 causes a copy of the digital object to be instantiated in an object window within the base-surface window. The main digital object 403 also enables multiple copies of a digital object of the repository selected by the user to appear in multiple object windows within the base-surface window.

The authentication module 308 controls and manages access to a user's digital objects and their data based on any kind of user authentication, such as (1) entering a username and a password via the viewer, (2) any biometric identification like, for example, a fingerprint reader, voice recognition, face recognition, and/or an iris scan, and/or (3) any kind of token like, for example, a secure card, an RFID token, a USB stick with a key file, and/or a secure exchange of such a user token over any kind of connection from a personal device to the display device 103 running the viewer software 102 of the viewer.

Once the user has been identified by the viewer software, the authentication module 308 will monitor any access of the management module 307 to digital objects and their data in a local data store 101 as well as access to remote data stores 109 and/or 107 and will refuse access to such objects and data if the user does not have the access rights necessary.

Having the authentication module 308 to control access to a user's digital objects and their data allows sharing of the same display device 103 among multiple users while still ensuring privacy and confidentiality of personal digital objects. This is particularly relevant for display devices in public places like restaurants, hotels, bus stops, etc., but can also be relevant in an office where users may share desks or in a household where it is not intended that all members of the family have access to the same digital objects and their data.

The digital object store module 309 provides access to a separate external server infrastructure called the digital object store in order to search for and add code bundles of new, previously not installed digital objects. The module 309 provides metadata about available code bundles like, for example, a description of the functionality, ratings and comments by other users, the author of the code, the code version, prerequisites to execute the code bundle, the price to buy it, etc. A user's access to this source of additional code bundles will usually take place in a digital object specifically designed for this purpose. In order to instantiate a new digital object that is not yet available as a local code bundle, the digital object store module 309 will first download the necessary code bundle, store it in an available data store and then instantiate the digital object requested by the user using the management module 307.

The digital object store module 309 is also responsible for regularly scanning local code bundles for outdated versions, and downloading and installing new versions of such bundles as well as re-instantiating existing digital objects based on the new code bundle supplied.

Another function of the digital object store module 309 is the handling of encrypting and decrypting code bundles. As code bundles used in the computer system 200 may be stored in readable form as source code, the digital object store module 309 will ensure integrity of the code and protect it from being copied without permission by keeping the code in encrypted form and decrypting it only to make it executable within the computer system's main memory 202.

The overlay module 310 enables a user to arrange a first digital object upon a second digital object (i.e., to overlay the first digital object upon the second digital object such that at least a portion of the first digital object overlaps with at least a portion of the second digital object) to enable both the first digital object and the second digital object to be utilized and/or manipulated as a group, for example, in a manner similar to the manner described above in connection with the container module 305. In one example, one or more objects can be made partially or fully transparent, and can be overlaid upon one or more additional objects. This arrangement enables the functionalities of multiple objects to be combined and used in new ways. For example, as shown in FIG. 13, a sketching object 1302 may be overlaid upon a map object 1301 or a photo object. The user may then use the sketching object 1302 to manually sketch or draw additional information, such as a route or a proposed change to the image, upon the map object 1301. In one example, by virtue of the positional relationship between the sketching object 1302 and the map object 1301, the combined output of the sketching object 1302 (e.g., the additional information that has been sketched or drawn) and the map object 1301 can convey more information than the sketching object 1302 or the map object 1301 might be able to convey by themselves.

In another example, as shown in FIG. 13, the overlay module 310 may enable the user to overlay upon a floor plan 1303 or a photograph one or more digital objects (e.g., a lamp control object 1304, a temperature control object 1305, and/or the like) that can be used to control one or more corresponding remote devices. For instance, the lamp object 1304 may be overlaid upon a portion of a floor plan that corresponds to a particular room in a dwelling, thereby enabling the user to interact with the lamp object 1304 to cause a lamp in that room to toggle on or off. In this way, based on the positions at which digital objects are overlaid relative to the floor plan or photo, those digital objects may be used to control lamps, loudspeakers, room temperature, or other corresponding remote devices in specific rooms.

In one example embodiment, the computer system 200 includes a plurality of display devices (e.g., the devices 209) or surfaces each structured to display a graphical interface to the user based on the computer code executed by the computer processor 201, wherein a digital object may be transferred from a first display device to a second display device. When the digital object is transferred from the first display device to the second display device, a visible appearance of the digital object moves smoothly from the first display device to the second display device. The digital object is transferred from the first display device to the second display device if the first display device electronically recognizes the second display device.

For example, a photo album object displaying a photo may be transferred from one display surface (e.g., a computer screen) to another display surface (e.g., a television monitor, a car display monitor, etc.). According to another example, a teacher may write a math problem on a teacher display surface (e.g., a large board at the front of a classroom) and transfer the math problem to multiple student display surfaces (e.g., tablets) so that the students can solve the math problem individually on their own display surface and return (e.g., electronically transfer) the solved problem back to the teacher.

In another example embodiment, the computer system 200 further includes a communication interface for wirelessly connecting the computer processor 201 to an external controller (not shown in FIG. 2), with the computer system 200 being portable by the user. When the computer system 200 enters a location recognized by the computer system 200 and controlled by the external controller, a signal received by the computer processor 201 from the external controller automatically initiates execution of a portion of the computer code to cause the display device to display one or more digital objects corresponding to the location.

In a further example embodiment, the system computer 200 further includes a sensor (not shown in FIG. 2) that senses a condition of an environment of the computer system 200, with the computer system 200 being portable by the user. When the sensor senses a predetermined condition of the environment of the computer system 200, the sensor provides a signal to the computer processor 201 to initiate execution of a portion of the computer code to cause the display device to display one or more digital objects corresponding to the predetermined condition of the environment of the computer system 200. Example types of sensors include a camera, a microphone, a heartrate sensor, a radio frequency identifier (RFID) reader, a bar code scanner, a humidity sensor, etc. Example types of predetermined conditions that may be sensed by the sensor include a predetermined time of day or night, a location of the computer system 200, movement of a physical object being present or moving in view of a camera, the presence of a sound signal, an RFID signal, or a bar code signal, a humidity level, a person entering an area near a display device or giving a spoken order, a current temperature level exceeding a predetermined threshold, etc.

In another example embodiment, the computer system 200 further includes a communication interface and/or wireless sensor (not shown in FIG. 2), such as a proximity sensor known in the art, that detects the spatial proximity of one or more additional computer systems 200 running the viewer software 102. In one example, the software 102 is configured so as to enable the two or more spatially proximate computer systems 200 to exchange information as they are brought close to one another. For instance, the display devices 103 can interact in a way that creates one virtual base-layer that spans across the two or more computer systems 200 recognized to be in spatial proximity with one another. This configuration enables the user to move digital objects 100 across display devices 103 as if they were one large display device.

In accordance with one example embodiment, a digital object can be configured to follow a user. When a sensor detects that a user enters a particular place or area in a room it instantiates a digital object on the display surface that is near the user. For example, in a museum, when a sensor detects a person near a display surface a virtual tour guide can be displayed on the display surface and provide a narration (e.g., continuing where it left off when the user moved away from the previous display surface).

In another example aspect herein, a television object showing a news broadcast can follow a user throughout an apartment. The television object can be displayed wherever the user enters an area near a display screen and can cease to be displayed wherever the user leaves the display screen.

According to one example embodiment, a virtual keyboard object is provided on a display surface in physical environments where a physical keyboard is either impractical or does not exist (e.g., at a kitchen counter or in a car).

Reference will now be made to FIG. 12, which shows a flowchart illustrating an example procedure 1200 for organizing, displaying, and interacting with information on a display device.

At block 1201, a graphical interface is displayed to a user. Information is received, at block 1202, from the user based on one or more images of the graphical interface. A main display area of the graphical interface is provided at block 1203. At block 1204, digital objects are organized in a plurality of layers. The layers include a base layer and a fixed layer. The base layer corresponds to a base-surface of the main display area. An appearance of one or more base-layer objects in the base-surface window may be selectively altered by the user. The fixed layer corresponds to a fixed-surface within the main display area. An appearance of one or more fixed-layer objects in the fixed-surface window are fixed or pinned when an appearance of a base-layer object is altered by the user. The user is enabled to (1) selectively set a digital object to the fixed-surface as a fixed-layer object (block 1205), (2) set a digital object as a base-layer object displayed in the basic-layer (block 1206), (3) instantiate new digital objects as bas layer objects (block 1207), and (4) create a group of base-layer objects, such that an appearance of the group of base-layer objects may be altered in unison (block 1208).

As can be appreciated in view of the above, the example embodiments described herein provide systems, methods, and computer program products for organizing and displaying information on a display device, such as a touch sensitive display surface, that covers a wide range of needs, and is platform independent, easy to use, and easy to expand.

While various example embodiments of the invention have been described above, it should be understood that they have been presented by way of example, and not limitation. It is apparent to persons skilled in the relevant art(s) that various changes in form and detail can be made therein. Thus, the invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the general public, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system of organizing, displaying, and interacting with information on a display device, the system comprising:
   a computer processor;
   a memory device accessible by the computer processor and storing at least one of:
      computer code executable by the computer processor, and
      data used by the computer code, wherein the computer code when executed causes the computer processor to:
         provide, to a display device of a user, a graphical interface that includes a main display area;
         organize digital objects in a plurality of layers, the layers including:
            a base layer corresponding to a base-surface window of the main display area, wherein an appearance of one or more base-layer objects in the base-surface window may be selectively altered by the user via an input device working in conjunction with graphical information of the graphical interface, the input device enabling the user to input information to the computer processor, and
            a fixed layer corresponding to a fixed-surface window of the main display area, wherein an appearance of one or more fixed-layer objects in the fixed-surface window are fixed or pinned when an appearance of a base-layer object is altered by the user via the input device;

alter, by the user via the input device, a size of at least one of: a base-layer object, a group of base-layer objects, all base-layer objects, and a viewable area of the base-surface window, displayed on the display device;

alter, by the user via the input device, a rotational orientation of at least one of: a base-layer object, a group of base-layer objects, all base-layer objects, and a viewable area of the base-surface window, displayed on the display device;

form, by the user via the input device, a group by overlaying a first base-layer digital object upon a second base-layer digital object in the base-surface window of the main display area to define an overlaid portion of the second base-layer digital object;

use the first base-layer digital object to control a remote device corresponding to the overlaid portion of the second base-layer digital object, the remote device being determined based on a positional relationship between the first base-layer digital object and the second base-layer digital object, in which the first base-layer digital object is positioned on the overlaid portion of the second base-layer digital object to which the remote device corresponds;

input information, by the user via the input device, to selectively pin and unpin a digital object to the fixed-surface window as a fixed-layer object, to set a digital object as a base-layer object displayed in the base-surface window, to change a base-layer object to a fixed-layer object, and to change a fixed-layer object to a base-layer object;

input information, by the user via the input device, to create a group of base-layer objects, such that an appearance of the group of base-layer objects may be altered in unison, wherein each digital object appearing in the base layer or the fixed layer corresponds to a user interface for an interactive application, and each digital object may be displayed in a fully displayed state, in which the user may interact with the corresponding interactive application, or in an iconized state;

change an appearance of a digital object to and from the iconized state and the fully displayed state; and input information, by the user via the input device, to cause a digital object in the base-surface window of the main display area to be zoomed and rotated in a single motion, the information being inputted by using the input device to drag a predetermined area of the corresponding digital object.

2. The system according to claim 1, wherein the computer code when executed causes the computer processor to move, zoom, and rotate a base-layer object within the base-surface window.

3. The system according to claim 1, wherein the computer code when executed causes the computer processor to move, zoom, and rotate the base-surface window within the main display area relative to a position of the fixed-surface window.

4. The system according to claim 1, wherein the computer code when executed causes the computer to selectively set a position of the fixed-surface window within the main display area, based on information inputted by the user via the input device.

5. The system according to claim 1, wherein the computer code when executed causes the computer processor to create a first group of base-layer objects different from a second group of base-layer objects, such that an appearance of the first group of base-layer objects may be altered in unison without altering an appearance of the second group of base-layer objects, based on information inputted by the user via the input device.

6. The system according to claim 1, further comprising a communication interface for connecting the computer processor to at least one of:

an apparatus connected to the system via a dedicated communication line, to allow the system to receive information from and send information to the apparatus, a local area network, to allow the system to receive information from and send information to one or more other systems connected to the local area network, and an Internet service provider, to allow the system to receive information from and send information to an Internet address, and wherein the communication interface is configured to perform at least one of: wireless communication and wired communication.

7. The system according to claim 1, wherein the input device includes at least one of:

a touch-sensitive sensor arrangement structured to receive pressure produced by the user on the display device, a voice receiver structured to receive sound commands produced by the user, and an electronic pointing device structured to be manipulated by the user to provide commands based on a location of a cursor on the display device.

8. The system according to claim 1, wherein the memory device stores code bundles, and wherein each code bundle includes executable code and configuration data for instantiating a corresponding digital object on the display device.

9. The system according to claim 1, wherein the display device is at least one of:

a touch-sensitive display surface that receives user input by sensing physical contact, and an electronic display monitor that receives user input via at least one of: a pointing device and a voice command.

10. The system according to claim 9, wherein a digital object may be moved, rotated, or zoomed by the user via at least one of:

a swipe motion on the touch-sensitive display surface, a tap on the touch-sensitive display surface, a drag motion of the pointing device, a click of the pointing device, and a spoken command.

11. The system according to claim 10, wherein, when the digital object is moved, rotated, or zoomed, a visible appearance of the digital object transitions smoothly from an initial appearance to a final appearance.

12. The system according to claim 1, wherein the computer code when executed causes the computer processor to provide at least one of:

one-command zooming, such that a single command issued by the user and received by the input device causes zooming to a predetermined size and a predetermined position, a sliding zoom scale, which enables the user to change the size smoothly and continuously in accordance with a slide position of the sliding zoom scale, the slide position being smoothly and continuously changeable by the user via the input device, and a zoom-level changer, which enables the user to incrementally change a zoom level to one of a plurality of discrete zoom levels.

13. The system according to claim 12, wherein the computer code when executed causes the computer processor to cause the sliding zoom scale to appear and disappear from the main display area by at least one of:
a tap input,
a swipe input,
a click input, and
a voice-command input,
based on information inputted by the user via the input device.

14. The system according to claim 12, wherein, when the sliding zoom scale appears in the main display area, the slide position of the sliding zoom scale is at a position corresponding to a current size of the base-surface window.

15. The system according to claim 13,
wherein the computer code when executed causes the computer processor to cause the sliding zoom scale to appear and disappear from the main display area by a tap input or a click input, based on information inputted by the user via the input device, and,
wherein a position of the tap input or the click input designates a position at which the sliding zoom scale appears in the main display area.

16. The system according to claim 12, wherein the computer code when executed causes the computer processor to display the sliding zoom scale at a predetermined position in the main display area.

17. The system according to claim 12, wherein the computer code when executed causes the computer processor to change the zoom level by at least one of:
a tap input,
a click input, and
a voice-command input,
based on information inputted by the user via the input device.

18. The system according to claim 1, wherein the digital objects include at least one of:
a document that includes at least one of: text, an image, a video, and an animation;
a media player that plays at least one of: music content, video content, and streaming media data;
a home appliance or device controller;
a game;
a navigation tool that reveals a particular portion of the main display area;
a social networking tool;
a reference tool that includes at least one of: a dictionary, thesaurus, and an encyclopedia; and
a container that associates a plurality of digital objects into a group, and enables the group to be displayed as an icon or in full size.

19. The system according to claim 1, wherein the computer code when executed causes the computer processor to change a position of a digital object in the main display area without changing a position of another digital object in the main display area.

20. The system according to claim 1, wherein
the digital object corresponds to a running interactive software application, and,
when the digital object appears in the fully displayed state in the main display area, the digital object may be locked to prevent changes to the running interactive software application, the changes being possible when the digital object is moved, rotated, or zoomed.

21. The system according to claim 1, wherein the computer code when executed causes the computer processor to change a rotational orientation of a base-layer object to an arbitrary angle without changing a rotational orientation of another base-layer object.

22. The system according to claim 1, wherein the computer code when executed causes the computer processor to change a rotational orientation of a group of base-layer objects to an arbitrary angle without changing a rotational orientation of the viewable area of the base-surface window.

23. The system according to claim 1, wherein the computer code when executed causes the computer processor to associate a plurality of digital objects into a group, such that a change in size, rotation, or position of the group causes a corresponding change in size, rotation, or position of each of the plurality of digital objects in the group, based on information inputted by the user via the input device.

24. The system according to claim 1,
wherein the computer code when executed causes the computer processor to dock a first digital object with a second digital object to form first and second docked digital objects that are operatively linked together, based on information inputted by the user via the input device,
wherein the first and second digital objects correspond to first and second interactive software applications, respectively, and
wherein data produced by the first interactive software program corresponding to the docked first digital object is used by the second interactive software applications corresponding to the second digital object to produce a combined output.

25. The system according to claim 24, wherein the first digital object is docked with the second digital object based on a touching position of the first digital object relative to the second digital object in the base-surface window.

26. The system according to claim 24, wherein the first digital object is undocked from the second digital object based on a spaced-apart position of the first digital object relative to the second digital object in the base-surface window.

27. The system according to claim 1,
wherein the computer code when executed causes the computer processor to manage a repository of digital objects selectable for use, based on information inputted by the user via the input device,
wherein the computer code when executed causes the computer processor to display a main digital object that manages access by the user to the repository, and
wherein the main digital object may be hidden or revealed in the main display area in accordance with a command inputted by the user.

28. The system according to claim 27, wherein the main digital object is a user interface for an interactive software application that:
provides a menu of the digital objects in the repository selectable by the user to be a base-layer object,
provides a menu of hierarchies of digital objects in the repository selectable by the user, in which digital objects belonging to a hierarchy share a common characteristic, such that a selection of a hierarchy from the menu results in a submenu of digital objects belonging to the selected hierarchy to be provided for selection by the user to be a base-layer object, and
provides a search input area for the user to input a search term to search for a digital object in the repository.

29. The system according to claim 28, wherein a digital object of the repository selected by the user via the main digital object causes a copy of the digital object to appear in an object window within the base-surface window.

30. The system according to claim 28, wherein the main digital object enables the user to save duplicate copies of a digital object in the repository under different names.

31. The system according to claim 28, wherein the main digital object enables the user to save different versions of a digital object in the repository under different names.

32. The system according to claim 28, wherein the main digital object enables multiple copies of a digital object of the repository selected by the user to be to appear multiple object windows within the base-surface window.

33. The system of claim 1, further comprising a plurality of display devices each structured to display a graphical interface to the user based on the computer code executed by the computer processor, wherein a digital object may be transferred from a first display device to a second display device.

34. The system of claim 33, wherein, when the digital object is transferred from the first display device to the second display device, a visible appearance of the digital object moves smoothly from the first display device to the second display device.

35. The system of claim 33, wherein, when the digital object is transferred from the first display device to the second display device if the first display device electronically recognizes the second display device.

36. The system of claim 1, wherein
the system further comprises a communication interface for wirelessly connecting the computer processor to an external controller,
the system is portable by the user,
when the system enters a location recognized by the system and controlled by the external controller, a signal received by the computer processor from the external controller automatically initiates execution of a portion of the computer code to cause the display device to display one or more digital objects corresponding to the location.

37. The system of claim 1, wherein
the system further comprises a sensor that senses a condition of an environment of the system,
the system is portable by the user,
when the sensor senses a predetermined condition of the environment of the system, the sensor provides a signal to the computer processor to initiate execution of a portion of the computer code to cause the display device to display one or more digital objects corresponding to the predetermined condition of the environment of the system.

38. The system of claim 1, further comprising a proximity sensor configured to detect a spatial proximity between the display device and an additional display device, wherein the computer code when executed causes the computer processor to create a virtual base-layer that spans across the display device and the additional display device, based on information inputted by the user via the input device.

39. A method of organizing, displaying, and interacting with information on a display device, the method comprising steps of:
providing, from a computer processor to a display device of a user, a graphical interface that includes a main display area;
organizing digital objects in a plurality of layers, the layers including:
a base layer corresponding to a base-surface window of the main display area, wherein an appearance of one or more base-layer objects in the base-surface window may be selectively altered by the user via instructions inputted by the user to the computer processor using an input device operating in conjunction with graphical information of the graphical interface, and
a fixed layer corresponding to a fixed-surface window of the main display area, wherein an appearance of one or more fixed-layer objects in the fixed-surface window are fixed or pinned when an appearance of a base-layer object is altered by the user via instructions inputted by the user to the computer processor using the input device,
wherein each digital object appearing in the base layer or the fixed layer corresponds to a user interface for an interactive application, and each digital object may be displayed in a fully displayed state, in which the user may interact with the corresponding interactive application, or in an iconized state;
receiving from the user, via the input device, input information to:
selectively pin and unpin a digital object to the fixed-surface window as a fixed-layer object,
set a digital object as a base-layer object displayed in the base-surface window,
change a base-layer object to a fixed-layer object,
change a fixed-layer object to a base-layer object, and
create a group of base-layer objects, such that an appearance of the group of base-layer objects may be altered in unison;
receiving from the user, via the input device, input information to zoom to alter a size of at least one of: a base-layer object, a group of base-layer objects, all base-layer objects, and a viewable area of the base-surface window, displayed on the display device;
receiving from the user, via the input device, input information to alter a rotational orientation of at least one of: a base-layer object, a group of base-layer objects, all base-layer objects, and a viewable area of the base-surface window, displayed on the display device;
receiving from the user, via the input device, input information to change an appearance of a digital object to and from the iconized state and the fully displayed state; and
receiving from the user, via the input device, input information to:
form a group by overlaying a first base-layer digital object upon a second base-layer digital object in the base-surface window of the main display area to define an overlaid portion of the second digital object, and
use the first base-layer digital object to control a remote device corresponding to the overlaid portion of the second base-layer digital object, the remote device being determined based on a positional relationship between the first base-layer digital object and the second base-layer digital object, in which the first base-layer digital object is positioned on the overlaid portion of the second base-layer digital object to which the remote device corresponds,
wherein a digital object in the base-surface window of the main display area is zoomable and rotatable in a single motion by using the input device to drag a predetermined area of the corresponding digital object.

40. The method according to claim 39, wherein the user causes a base-layer object within the base-surface window to move, zoom, and rotate by using the input device.

41. The method according to claim 39, wherein the user causes the base-surface window to move, zoom, and rotate within the main display area relative to a position of the fixed-surface window by using the input device.

42. The method according to claim 39, further comprising receiving from the user, via the input device, input information to selectively set a position of the fixed-surface window within the main display area.

43. The method according to claim 39, further comprising receiving from the user, via the input device, input information to create a first group of base-layer objects different from a second group of base-layer objects, such that an appearance of the first group of base-layer objects may be altered in unison without altering an appearance of the second group of base-layer objects.

44. The method according to claim 39, further comprising providing a communication interface for connecting a computer processor to at least one of:
  an apparatus connected to a system via a dedicated communication line, to allowing the system to receive information from and send information to the apparatus,
  a local area network, to allow the system to receive information from and send information to one or more other systems connected to the local area network, and
  an Internet service provider, to allow the system to receive information from and send information to an Internet address, and
  wherein the communication interface is configured to perform at least one of: wireless communication and wired communication.

45. The method according to claim 39, further comprising:
  receiving, via a touch-sensitive sensor arrangement, pressure produced by the user on the display device,
  receiving, via a voice receiver, sound commands produced by the user, and
  receiving, via an electronic pointing device, manipulations by the user to provide commands based on a location of a cursor on the display device.

46. The method according to claim 39, further comprising:
  storing code bundles in a memory device,
  wherein each code bundle includes executable code and configuration data for instantiating a corresponding digital object on the display device.

47. The method according to claim 39, further comprising:
  receiving, via a touch-sensitive display surface, user input by sensing physical contact, and
  receiving, via an electronic display monitor, user input via at least one of: a pointing device and a voice command.

48. The method according to claim 47, wherein a digital object may be moved, rotated, or zoomed by the user via at least one of:
  a swipe motion on the touch-sensitive display surface,
  a tap on the touch-sensitive display surface,
  a drag motion of the pointing device,
  a click of the pointing device, and
  a spoken command.

49. The method according to claim 48, wherein, when the digital object is moved, rotated, or zoomed, a visible appearance of the digital object transitions smoothly from an initial appearance to a final appearance.

50. The method according to claim 39, further comprising providing:
  one-command zooming, such that a single command issued by the user causes zooming to a predetermined size and a predetermined position,
  a sliding zoom scale, which enables the user to change the size smoothly and continuously in accordance with a slide position of the sliding zoom scale, the slide position being smoothly and continuously changeable by the user, and
  a zoom-level changer, which enables the user to incrementally change a zoom level to one of a plurality of discrete zoom levels.

51. The method according to claim 50, further comprising receiving from the user, via the input device, input information to cause the sliding zoom scale to appear and disappear from the main display area by at least one of:
  a tap input,
  a swipe input,
  a click input, and
  a voice-command input.

52. The method according to claim 51, further comprising receiving from the user, via the input device, input information to cause the sliding zoom scale to appear and disappear from the main display area by a tap input or a click input, wherein a position of the tap input or the click input designates a position at which the sliding zoom scale appears in the main display area.

53. The method according to claim 50, wherein, when the sliding zoom scale appears in the main display area, the slide position of the sliding zoom scale is at a position corresponding to a current size of the base-surface window.

54. The method according to claim 50, further comprising displaying the sliding zoom scale at a predetermined position in the main display area.

55. The method according to claim 50, further comprising receiving from the user, via the input device, input information to change the zoom level by at least one of:
  a tap input,
  a click input, and
  a voice-command input.

56. The method according to claim 39, wherein the digital objects include at least one of:
  a document that includes at least one of: text, an image, a video, and an animation;
  a media player that plays at least one of: music content, video content, and streaming media data;
  a home appliance or device controller;
  a game;
  a navigation tool that reveals a particular portion of the main display area;
  a social networking tool;
  a reference tool that includes at least one of: a dictionary, thesaurus, and an encyclopedia; and
  a container that associates a plurality of digital objects into a group, and enables the group to be displayed as an icon or in full size.

57. The method according to claim 39, further comprising receiving from the user, via the input device, input information to change a position of a digital object in the main display area without changing a position of another digital object in the main display area.

58. The method according to claim 39, wherein
  the digital object corresponds to a running interactive software application, and,
  when the digital object appears in the fully displayed state in the main display area, the digital object may be locked to prevent changes to the running interactive software application, the changes being possible when the digital object is moved, rotated, or zoomed.

59. The method according to claim 39, further comprising receiving from the user, via the input device, input information to change a rotational orientation of a base-layer object to an arbitrary angle without changing a rotational orientation of another base-layer object.

60. The method according to claim 39, further comprising receiving from the user, via the input device, input information to change a rotational orientation of a group of base-layer objects to an arbitrary angle without changing a rotational orientation of the viewable area of the base-surface window.

61. The method according to claim 39, further comprising receiving from the user, via the input device, input information to associate a plurality of digital objects into a group, such that a change in size, rotation, or position of the group causes a corresponding change in size, rotation, or position of each of the plurality of digital objects in the group.

62. The method according to claim 39, further comprising receiving from the user, via the input device, input information to dock a first digital object with a second digital object to form first and second docked digital objects that are operatively linked together,
  wherein the first and second digital objects correspond to first and second interactive software applications, respectively, and
  wherein data produced by the first interactive software program corresponding to the docked first digital object is used by the second interactive software applications corresponding to the second digital object to produce a combined output.

63. The method according to claim 62, wherein the first digital object is docked with the second digital object based on a touching position of the first digital object relative to the second digital object in the base-surface window.

64. The method according to claim 62, wherein the first digital object is undocked from the second digital object based on a spaced-apart position of the first digital object relative to the second digital object in the base-surface window.

65. The method according to claim 39, further comprising receiving from the user, via the input device, input information to manage a repository of digital objects selectable for use,
  wherein a management module includes a main digital object that manages access by the user to the repository, and
  wherein the main digital object may be hidden or revealed in the main display area in accordance with a command inputted by the user.

66. The method according to claim 65, wherein the main digital object is a user interface for an interactive software application that:
  provides a menu of the digital objects in the repository selectable by the user to be a base-layer object,
  provides a menu of hierarchies of digital objects in the repository selectable by the user, in which digital objects belonging to a hierarchy share a common characteristic, such that a selection of a hierarchy from the menu results in a submenu of digital objects belonging to the selected hierarchy to be provided for selection by the user to be a base-layer object, and
  provides a search input area for the user to input a search term to search for a digital object in the repository.

67. The method according to claim 66, wherein a digital object of the repository selected by the user via the main digital object causes a copy of the digital object to appear in an object window within the base-surface window.

68. The method according to claim 66, wherein the main digital object enables the user to save duplicate copies of a digital object in the repository under different names.

69. The method according to claim 66, wherein the main digital object enables the user to save different versions of a digital object in the repository under different names.

70. The method according to claim 66, wherein the main digital object enables multiple copies of a digital object of the repository selected by the user to be to appear multiple object windows within the base-surface window.

71. The method of claim 39, wherein a plurality of display devices are each structured to display a graphical interface to the user based on the computer code executed by the computer processor, wherein a digital object may be transferred from a first display device to a second display device.

72. The method of claim 71, wherein, when the digital object is transferred from the first display device to the second display device, a visible appearance of the digital object moves smoothly from the first display device to the second display device.

73. The method of claim 71, wherein, when the digital object is transferred from the first display device to the second display device if the first display device electronically recognizes the second display device.

74. The method of claim 39, wherein
  when a portable system is brought into a location that is recognized by the system and controlled by an external controller, a signal is received by a computer processor from the external controller and the display device is automatically caused to display one or more digital objects corresponding to the location.

75. The method of claim 39, further comprising:
  sensing a predetermined condition of an environment of a system, and
  providing a signal to a computer processor to cause the display device to display one or more digital objects corresponding to the predetermined condition of the environment of the system.

76. The method of claim 39, further comprising:
  detecting, via a proximity sensor, a spatial proximity between the display device and an additional display device; and
  receiving from the user, via the input device, input information to create a virtual base-layer that spans across the display device and the additional display device.

77. A non-transitory computer-readable medium having stored thereon sequences of instructions, the sequences of instructions including instructions, which, when executed by a computer system, cause the computer system to:
  provide, from a computer processor to a display device of a user, a graphical interface that includes a main display area;
  organize digital objects in a plurality of layers, the layers including:
    a base layer corresponding to a base-surface window of the main display area, wherein an appearance of one or more base-layer objects in the base-surface window may be selectively altered by the user via instructions inputted by the user to the computer processor using an input device operating in conjunction with graphical information of the graphical interface, and a fixed layer corresponding to a fixed-surface window of the main display area, wherein an appearance of one or more fixed-layer objects in the fixed-surface window are fixed or pinned when an appearance of a base-layer object is altered by the user via instructions inputted by the user to the computer processor using the input device, wherein each digital object appearing in the base layer or the fixed layer corresponds to a user interface for an interactive application, and each digital object may be displayed in a fully displayed state, in which the user may interact with the corresponding interactive application, or in an iconized state;

receive from the user, via the input device, input information to:
- selectively pin and unpin a digital object to the fixed-surface window as a fixed-layer object,
- set a digital object as a base-layer object displayed in the base-surface window,
- change a base-layer object to a fixed-layer object,
- change a fixed-layer object to a base-layer object, and
- create a group of base-layer objects, such that an appearance of the group of base-layer objects may be altered in unison;

receive from the user, via the input device, input information to zoom to alter a size of at least one of: a base-layer object, a group of base-layer objects, all base-layer objects, and a viewable area of the base-surface window, displayed on the display device;

receive from the user, via the input device, input information to alter a rotational orientation of at least one of: a base-layer object, a group of base-layer objects, all base-layer objects, and a viewable area of the base-surface window, displayed on the display device;

receive from the user, via the input device, input information to change an appearance of a digital object to and from the iconized state and the fully displayed state; and receive from the user, via the input device, input information to:
- form a group by overlaying a first base-layer digital object upon a second base-layer digital object in the base-surface window of the main display area to define an overlaid portion of the second digital object, and
- use the first base-layer digital object to control a remote device corresponding to the overlaid portion of the second base-layer digital object, the remote device being determined based on a positional relationship between the first base-layer digital object and the second base-layer digital object, in which the first base-layer digital object is positioned on the overlaid portion of the second base-layer digital object to which the remote device corresponds, wherein each digital object appearing in the base layer or the fixed layer corresponds to a user interface for an interactive application, and each digital object may be displayed in a fully displayed state, in which the user may interact with the corresponding interactive application, or in an iconized state, based on an instruction inputted by the user using the input device, and wherein a digital object in the base-surface window of the main display area is zoomable and rotatable in a single motion by using the input device to drag a predetermined area of the corresponding digital object.

78. The non-transitory computer-readable medium according to claim 77, wherein the sequences of instructions cause a base-layer object to move, zoom, and rotate within the base-surface window, based on information inputted by the user via use of the input device.

79. The non-transitory computer-readable medium according to claim 77, wherein the sequences of instructions cause the base-surface window within the main display area to move, zoom, and rotate relative to a position of the fixed-surface window, based on information inputted by the user via use of the input device.

80. The non-transitory computer-readable medium according to claim 77, further having stored thereon sequences of instructions, which, when executed by the computer system, cause the computer system to set a position of the fixed-surface window within the main display area, based on information inputted by the user via use of the input device.

81. The non-transitory computer-readable medium according to claim 77, further having stored thereon sequences of instructions, which, when executed by the computer system, cause the computer system to create a first group of base-layer objects different from a second group of base-layer objects, such that an appearance of the first group of base-layer objects may be altered in unison without altering an appearance of the second group of base-layer objects, based on information inputted by the user.

82. The non-transitory computer-readable medium according to claim 77, further having stored thereon sequences of instructions, which, when executed by the computer system, cause the computer system to provide a communication interface for connecting the computer processor to at least one of:
- an apparatus connected to the system via a dedicated communication line, to allow the system to receive information from and send information to the apparatus,
- a local area network, to allow the system to receive information from and send information to one or more other systems connected to the local area network, and
- an Internet service provider, to allow the system to receive information from and send information to an Internet address, and wherein the communication interface is configured to perform at least one of: wireless communication and wired communication.

83. The non-transitory computer-readable medium according to claim 77, further having stored thereon sequences of instructions, which, when executed by the computer system, cause the computer system to:
- receive, via a touch-sensitive sensor arrangement, pressure produced by the user on the display device,
- receive, via a voice receiver, sound commands produced by the user, and
- receive, via an electronic pointing device, manipulations by the user to provide commands based on a location of a cursor on the display device.

84. The non-transitory computer-readable medium according to claim 77, further having stored thereon sequences of instructions, which, when executed by the computer system, cause the computer system to:
- store code bundles in a memory device,
- wherein each code bundle includes executable code and configuration data for instantiating a corresponding digital object on the display device.

85. The non-transitory computer-readable medium according to claim 77, further having stored thereon sequences of instructions, which, when executed by the computer system, cause the computer system to:

receive, via a touch-sensitive display surface, user input by sensing physical contact, and receive, via an electronic display monitor, user input via at least one of: a pointing device and a voice command.

86. The non-transitory computer-readable medium according to claim 85, wherein a digital object may be moved, rotated, or zoomed by the user via at least one of:
   a swipe motion on the touch-sensitive display surface,
   a tap on the touch-sensitive display surface,
   a drag motion of the pointing device,
   a click of the pointing device, and
   a spoken command.

87. The non-transitory computer-readable medium according to claim 86, wherein, when the digital object is moved, rotated, or zoomed, a visible appearance of the digital object transitions smoothly from an initial appearance to a final appearance.

88. The non-transitory computer-readable medium according to claim 77, further having stored thereon sequences of instructions, which, when executed by the computer system, cause the computer system to provide at least one of:
   one-command zooming, such that a single command issued by the user and received by the input device causes zooming to a predetermined size and a predetermined position,
   a sliding zoom scale, which is used by the user to change the size smoothly and continuously in accordance with a slide position of the sliding zoom scale, the slide position being smoothly and continuously changeable by the user via the input device, and
   a zoom-level changer, which is used by the user to incrementally change a zoom level to one of a plurality of discrete zoom levels.

89. The non-transitory computer-readable medium according to claim 88, further having stored thereon sequences of instructions, which, when executed by the computer system, cause the computer system to cause the sliding zoom scale to appear and disappear from the main display area by at least one of:
   a tap input,
   a swipe input,
   a click input, and
   a voice-command input,
based on information inputted by the user via the input device.

90. The non-transitory computer-readable medium according to claim 89, further having stored thereon sequences of instructions, which, when executed by the computer system, cause the computer system to cause the sliding zoom scale to appear and disappear from the main display area by a tap input or a click input, based on information inputted by the user via the input device,
   wherein a position of the tap input or the click input designates a position at which the sliding zoom scale appears in the main display area.

91. The non-transitory computer-readable medium according to claim 88, wherein, when the sliding zoom scale appears in the main display area, the slide position of the sliding zoom scale is at a position corresponding to a current size of the base-surface window.

92. The non-transitory computer-readable medium according to claim 88, further having stored thereon sequences of instructions, which, when executed by the computer system, cause the computer system to display the sliding zoom scale at a predetermined position in the main display area.

93. The non-transitory computer-readable medium according to claim 88, further having stored thereon sequences of instructions, which, when executed by the computer system, cause the computer system to change the zoom level by at least one of:
   a tap input,
   a click input, and
   a voice-command input,
based on information inputted by the user via the input device.

94. The non-transitory computer-readable medium according to claim 77, wherein the digital objects include at least one of:
   a document that includes at least one of: text, an image, a video, and an animation;
   a media player that plays at least one of: music content, video content, and streaming media data;
   a home appliance or device controller;
   a game;
   a navigation tool that reveals a particular portion of the main display area;
   a social networking tool;
   a reference tool that includes at least one of: a dictionary, thesaurus, and an encyclopedia; and
   a container that associates a plurality of digital objects into a group, and enables the group to be displayed as an icon or in full size.

95. The non-transitory computer-readable medium according to claim 77, further having stored thereon sequences of instructions, which, when executed by the computer system, cause the computer system to change a position of a digital object in the main display area without changing a position of another digital object in the main display area, based on information inputted by the user via the input device.

96. The non-transitory computer-readable medium according to claim 77, wherein
   the digital object corresponds to a running interactive software application, and,
   when the digital object appears in the fully displayed state in the main display area, the digital object may be locked to prevent changes to the running interactive software application, the changes being possible when the digital object is moved, rotated, or zoomed.

97. The non-transitory computer-readable medium according to claim 77, further having stored thereon sequences of instructions, which, when executed by the computer system, cause the computer system to change a rotational orientation of a base-layer object to an arbitrary angle without changing a rotational orientation of another base-layer object, based on information inputted by the user via the input device.

98. The non-transitory computer-readable medium according to claim 77, further having stored thereon sequences of instructions, which, when executed by the computer system, cause the computer system to change a rotational orientation of a group of base-layer objects to an arbitrary angle without changing a rotational orientation of the viewable area of the base-surface window, based on information inputted by the user via the input device.

99. The non-transitory computer-readable medium according to claim 77, further having stored thereon sequences of instructions, which, when executed by the computer system, cause the computer system to associate a plurality of digital objects into a group, such that a change in size, rotation, or position of the group causes a corresponding change in size, rotation, or position of each of the plurality of digital objects in the group, based on information inputted by the user via the input device.

100. The non-transitory computer-readable medium according to claim 77, further having stored thereon sequences of instructions, which, when executed by the computer system, cause the computer system to dock a first digital object with a second digital object to form first and second docked digital objects that are operatively linked together, based on information inputted by the user via the input device,
wherein the first and second digital objects correspond to first and second interactive software applications, respectively, and
wherein data produced by the first interactive software program corresponding to the docked first digital object is used by the second interactive software applications corresponding to the second digital object to produce a combined output.

101. The non-transitory computer-readable medium according to claim 100, wherein the first digital object is docked with the second digital object based on a touching position of the first digital object relative to the second digital object in the base-surface window.

102. The non-transitory computer-readable medium according to claim 100, wherein the first digital object is undocked from the second digital object based on a spaced-apart position of the first digital object relative to the second digital object in the base-surface window.

103. The non-transitory computer-readable medium according to claim 77, further having stored thereon sequences of instructions, which, when executed by the computer system, cause the computer system to:
manage a repository of digital objects selectable for use, and
manage access by the user to the repository,
based on information inputted by the user via the input device, wherein the main digital object may be hidden or revealed in the main display area in accordance with a command inputted by the user.

104. The non-transitory computer-readable medium according to claim 103, wherein the main digital object is a user interface for an interactive software application that:
provides a menu of the digital objects in the repository selectable by the user to be a base-layer object,
provides a menu of hierarchies of digital objects in the repository selectable by the user, in which digital objects belonging to a hierarchy share a common characteristic, such that a selection of a hierarchy from the menu results in a submenu of digital objects belonging to the selected hierarchy to be provided for selection by the user to be a base-layer object, and
provides a search input area for the user to input a search term to search for a digital object in the repository.

105. The non-transitory computer-readable medium according to claim 104, wherein a digital object of the repository selected by the user via the main digital object causes a copy of the digital object to appear in an object window within the base-surface window.

106. The non-transitory computer-readable medium according to claim 104, further having stored thereon sequences of instructions, which, when executed by the computer system, cause the computer system to save duplicate copies of a digital object in the repository under different names, based on information inputted by the user via the input device.

107. The non-transitory computer-readable medium according to claim 104, further having stored thereon sequences of instructions, which, when executed by the computer system, cause the computer system to save different versions of a digital object in the repository under different names, based on information inputted by the user via the input device.

108. The non-transitory computer-readable medium according to claim 104, further having stored thereon sequences of instructions, which, when executed by the computer system, cause the computer system to display multiple copies of a digital object of the repository selected by the user in multiple object windows within the base-surface window, based on information inputted by the user via the input device.

109. The non-transitory computer-readable medium of claim 77, further having stored thereon sequences of instructions, which, when executed by the computer system, cause the computer system to display a graphical interface to the user, wherein a digital object may be transferred from a first display device to a second display device.

110. The non-transitory computer-readable medium of claim 109, wherein, when the digital object is transferred from the first display device to the second display device, a visible appearance of the digital object moves smoothly from the first display device to the second display device.

111. The non-transitory computer-readable medium of claim 109, wherein, when the digital object is transferred from the first display device to the second display device if the first display device electronically recognizes the second display device.

112. The non-transitory computer-readable medium of claim 77, wherein when the medium is brought into a location that is recognized by the medium and controlled by an external controller, a signal is received by a computer processor from the external controller and the display device is automatically caused to display one or more digital objects corresponding to the location.

113. The non-transitory computer-readable medium of claim 77, further having stored thereon sequences of instructions, which, when executed by the computer system, cause the computer system to:
sense a predetermined condition of the environment of the system; and
provide a signal to a computer processor to cause the display device to display one or more digital objects corresponding to the predetermined condition of the environment of the system.

114. The non-transitory computer-readable medium of claim 77, further having stored thereon sequences of instructions, which, when executed by the computer system, cause the computer system to:
detect a spatial proximity between the display device and an additional display device, and
create a virtual base-layer that spans across the display device and the additional display device, based on information inputted by the user via the input device.

* * * * *

UNITED STATES PATENT AND TRADEMARK OFFICE
CERTIFICATE OF CORRECTION

| | |
|---|---|
| PATENT NO. | : 9,645,718 B2 |
| APPLICATION NO. | : 14/172685 |
| DATED | : May 9, 2017 |
| INVENTOR(S) | : Matthias Aebi |

It is certified that error appears in the above-identified patent and that said Letters Patent is hereby corrected as shown below:

On the Title Page

(57) ABSTRACT:
Line 5, "puters" should read --puter--.

In the Specification

Column 7:
Line 23, "virtual" should read --a virtual--.
Line 34, "time-table for," should read --time-table,--.
Line 52, "to be" should read --from being--.

Column 8:
Line 12, "basic-layer," should read --base layer,--.

Column 10:
Line 38, "to" should read --will--.

Column 11:
Line 41, "object" should read --an object--.

Column 16:
Line 1, "basic-layer" should read --base layer--.
Line 2, "bas layer" should read --base-layer--.

In the Claims

Column 21:
Line 13, Claim 32 "to be to appear" should read --to appear in--.
Line 28, Claim 35 "device if" should read --device,--.

Signed and Sealed this
Fifth Day of June, 2018

Andrei Iancu
*Director of the United States Patent and Trademark Office*

CERTIFICATE OF CORRECTION (continued)
U.S. Pat. No. 9,645,718 B2

Column 26:
Line 13, Claim 70 "to be to appear" should read --to appear in--.
Line 28, Claim 73 "device if" should read --device,--.

Column 32:
Line 32, Claim 111 "device if" should read --device,--.